United States Patent
Zee et al.

(10) Patent No.: US 10,966,128 B2
(45) Date of Patent: Mar. 30, 2021

(54) NETWORK NODES AND METHODS PERFORMED THEREIN FOR ENABLING COMMUNICATION IN A COMMUNICATION NETWORK

(71) Applicant: TELEFONAKTIEBOLAGET LM ERICSSON (PUBL), Stockholm (SE)

(72) Inventors: Oscar Zee, Stockholm (SE); Walter Müller, Upplands Väsby (SE); Elena Myhre, Järfälla (SE); Jari Vikberg, Järna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 86 days.

(21) Appl. No.: 16/071,540

(22) PCT Filed: Feb. 15, 2016

(86) PCT No.: PCT/EP2016/053182
§ 371 (c)(1),
(2) Date: Jul. 20, 2018

(87) PCT Pub. No.: WO2017/140340
PCT Pub. Date: Aug. 24, 2017

(65) Prior Publication Data
US 2019/0028941 A1    Jan. 24, 2019

(51) Int. Cl.
*H04W 36/00* (2009.01)
*H04W 36/32* (2009.01)

(52) U.S. Cl.
CPC ... *H04W 36/0077* (2013.01); *H04W 36/0066* (2013.01); *H04W 36/32* (2013.01)

(58) Field of Classification Search
CPC ......... H04W 36/0077; H04W 36/0066; H04W 36/32
See application file for complete search history.

(56) References Cited

U.S. PATENT DOCUMENTS 6,973,053 B1 * 12/2005 Passman .............. H04L 45/04
370/310
2014/0370894 A1   12/2014 Hosdurg et al.
(Continued)

OTHER PUBLICATIONS

Deutsche Telecom, "Key issue: 3GPP architecture impacts to support network slicing roaming", 3GPP Draft, S2-153934, SA WG2 Meeting #112, Nov. 16-20, 2015, Anaheim, California.
(Continued)

*Primary Examiner* — Huy D Vu
*Assistant Examiner* — Bailor C. Hsu
(74) *Attorney, Agent, or Firm* — Patent Portfolio Builders, PLLC

(57) ABSTRACT

Embodiments herein relate to a method performed by a wireless device, for handling a mobility procedure in a communication network. The communication network comprises a first network and a second network. The first network is associated with a core network node and a first RAN node. The second network is associated with a second RAN node. The first RAN node and the second RAN node each support a set of cells. The first and the second network comprise partitioned sets of functionalities, wherein a first set of functionalities belongs to a first network slice supporting the wireless device. The wireless device is associated with the first network and the first network slice in a first cell of the first RAN node. The network slices and corresponding network slice identities are uncoordinated between the first and the second network. The wireless device receives, from the core network node, a message comprising an indication of combinations of networks and network slices equivalent to the first network slice. The wireless device determines a cell from the second set of cells supported by the second RAN node, which cell supports an equivalent of the first slice, based on the indication received from the core network node.

21 Claims, 17 Drawing Sheets

(56) References Cited

U.S. PATENT DOCUMENTS

| | | | |
|---|---|---|---|
| 2015/0154258 A1* | 6/2015 | Xiong | H04L 43/0876 |
| | | | 707/718 |
| 2016/0353465 A1* | 12/2016 | Vrzic | H04W 12/06 |
| 2017/0079059 A1* | 3/2017 | Li | H04W 16/02 |
| 2017/0086118 A1* | 3/2017 | Vrzic | H04W 36/26 |
| 2017/0164187 A1* | 6/2017 | Lu | H04W 8/24 |
| 2017/0164349 A1* | 6/2017 | Zhu | H04W 48/18 |
| 2017/0245316 A1* | 8/2017 | Salkintzis | H04W 76/10 |
| 2018/0352501 A1* | 12/2018 | Zhang | H04W 48/14 |

OTHER PUBLICATIONS

NTT Docomo, "Solution to support a UE with simultaneous connections to multiple Network Slices", 3GPP Draft, S2-161043, Feb. 23-26, 2016, Sophia Antipolis, France.

* cited by examiner

NETWORK NODES AND METHODS PERFORMED THEREIN FOR ENABLING COMMUNICATION IN A COMMUNICATION NETWORK

CROSS REFERENCE TO RELATED APPLICATIONS

This application is a U.S. National Stage Filing under 35 U.S.C. § 371 of International Application No. PCT/EP2016/053182, filed on Feb. 15, 2016, the disclosure of which is fully incorporated herein by reference.

TECHNICAL FIELD

Embodiments herein relate to a wireless device, a Radio Access Network, RAN, node, a core network node, and methods performed therein for communication. Furthermore, a computer program and a computer readable storage medium are also provided herein. In particular, embodiments herein relate to enabling mobility procedures for a wireless device in a communication network.

BACKGROUND

In a typical communication network, wireless devices, also known as wireless communication devices, mobile stations, stations (STA) and/or user equipment (UE), communicate via a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a "NodeB" or "eNodeB". A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3$^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. FIG. 1 is an overview of the EPC architecture. This architecture is defined in 3GPP TS 23.401 v.13.4.0 wherein a definition of a Packet Data Network Gateway (PGW), a Serving Gateway (SGW), a Policy and Charging Rules Function (PCRF), a Mobility Management Entity (MME) and a wireless or mobile device (UE) is found. The LTE radio access, E-UTRAN, comprises one or more eNBs. FIG. 2 shows the overall E-UTRAN architecture and is further defined in for example 3GPP TS 36.300 v.13.1.0. The E-UTRAN comprises radio access nodes, such as eNBs, Home eNBs, which are also referred to as HeNBs, providing a user plane comprising the protocol layers Packet Data Convergence Protocol (PDCP)/Radio Link Control (RLC)/Medium Access Control (MAC)/Physical layer (PHY), and a control plane comprising Radio Resource Control (RRC) protocol in addition to the user plane protocols towards the wireless device. The radio network nodes are interconnected with each other by means of the X2 interface and/or via an X2GW. The radio network nodes are also connected by means of the S1 interface to the EPC comprising EPC nodes, such as MME, S-GW and HeNB GateWays (GW). More specifically the radio network nodes are connected to the MME by means of an S1-MME interface and to the S-GW by means of an S1-U interface.

FIG. 3 shows a management system architecture in the communications network. The node elements (NE), also referred to as eNodeB, are managed by a domain manager (DM), also referred to as the operation and support system (OSS). A DM may further be managed by a network manager (NM). Two NEs are interfaced by X2, whereas the interface between two DMs is referred to as Itf-P2P. The management system may configure the network elements, as well as receive observations associated to features in the network elements. For example, the DM observes and configures the NEs, while the NM observes and configures the DM, as well as the NE via the DM.

By means of configuration via the DM, NM and related interfaces, functions over the X2 and S1 interfaces can be carried out in a coordinated way throughout the RAN, eventually involving the Core Network, i.e. MMEs and S-GWs.

The S1-MME interface is used for control plane between eNodeB/E-UTRAN and MME. The main protocols used in this interface are S1 Application Protocol (S1AP) and Stream Control Transmission Protocol (SCTP). S1AP is the application Layer Protocol between the radio network node and the MME and SCTP for example guarantees delivery of signaling messages between MME and the radio network node. The transport network layer is based on Internet Protocol (IP).

A subset of the S1 interface provided functions are:
S1-interface management functions such as S1 setup, error indication, reset and the radio network node and MME configuration update.
UE Context Management functionality such as Initial Context Setup Function and UE Context Modification Function.
E-UTRAN Radio Access Bearer (E-RAB) Service Management functions e.g. Setup, Modify, Release.
Mobility Functions for wireless devices in EPS Connection Management (ECM)-CONNECTED, e.g. Intra-LTE Handover and inter-3GPP-Radio Access Technology (RAT) Handover.
S1 Paging function.
Non Access Stratum (NAS) Signaling Transport function.

In order to save energy a wireless device may enter RRC/ECM idle mode when it does not exchange data with a network, such as a Public Land Mobile Network (PLMN). When the wireless device is in RRC/ECM idle mode, several related mobility procedures will occur such as e.g. Cell selection, Cell Reselection and PLMN selection. These procedures are described in detailed way in 3GPP TS 36.304 and 3GPP TS 23.122. When the UE is in idle mode, the UE will select a cell to camp on. This selection is mainly based on:
Allowed PLMNs, based on current registered PLMN and any possible Equivalent PLMNs.
Radio conditions of cells in different frequency layers.

The wireless device is also able to initiate NAS procedures, such as e.g. Tracking Area Update (TAU) if necessary.

The wireless device, such as the UE, receives the following information from different entities which is useful in idle mode mobility functions.

From the core network node, such as an MME, the wireless device may receive information in e.g. "NAS: Attach Accept" or "NAS: Tracking Area Update Accept" messages, such as:
List of Equivalent PLMNs, used for PLMN selection in case of loss of radio coverage of the registered PLMN.
Tracking Area Identifier List, for checking if a NAS TAU procedure is needed once UE is re-selected to a new cell.

From the RAN node the wireless device may receive information, e.g. in a system information, such as a System Information Block (SIB), in a "RRCConnectionRelease" message, or by inheriting from another RAT at inter-RAT cell (re)selection. The information from the RAN node comprises:
Absolute priorities of different E-UTRAN frequencies or inter-RAT frequencies, for prioritization of frequency layers the wireless device shall camp on. These absolute priorities may be common to all wireless devices, in case system information is used, or dedicated to a specific wireless device, in case dedicated RRC signaling is used. If the wireless device receives dedicated priorities then these have priority over the common priorities available over system information.

An example of the system information received from the RAN node is shown in FIG. 4. All system information comprises a MasterInformationBlock (MIB) and multiple different SystemInformationBlock (SIB) Types. The main parts of existing LTE/E-UTRAN SystemInformationBlock Type1 (SIB1) are shown in FIG. 4. The cellAccessRelatedInfo may contain up to 6 different PLMN-IDs to support network sharing. A single Tracking Area Code (TAC) is used for all the different PLMN-IDs to build up to 6 different Tracking Area Identities. In addition, Cell Identity and CSG related information are examples of additional information included in the SIB1. The SIB1 may further contain multiple other information elements as described in 3GPP TS 36.331.

An example on how idle mode mobility functions are performed in a prior art network is shown in FIG. 5.

Action 500: When the wireless device enters a network, e.g. when the wireless device is turned on, the wireless device has information about its home network, which herein also is referred to as the HPLMN. This information may for example be stored on a Subscriber Identity Module (SIM) and/or a Universal Subscriber Identity Module (USIM) that may also contain additional information about other networks, for example allowed visited networks (VPLMN). Further core network nodes, such as the MME1 and the MME2, support different networks which are identified using a Tracking Area Identifier (TAI), which comprises a network identity, such as a PLMN-ID, and a Tracking Area Code (TAC). This scenario is shown in step 500 in FIG. 5 where the UE has support for HPLMN=A, the MME1 has support for TAI=A-m and TAI=A-n, which indicates that MME1 supports the PLMN=A in the TAC=m and in TAC=n, and the MME2 has support for TAI=C-p, i.e. PLMN=C in tracking area p.

Action 501: When the UE is switched on it will receive a broadcasted SIB from RAN nodes, such as the eNBs. The SIB comprises information on the networks supported by the eNB, indicated via the PLMN-ID, and the tracking area which the eNB is comprised in, indicated by the TAC and the PLMN-ID. In this case a first eNB, which in FIG. 5 is indicated as the source eNB, supports the networks A and B as indicated by the PLMN-IDs and is located in the tracking area m as indicated by the TAC=m.

Action 502: Since the first cell supports the network A which is the home network of the UE, the UE will camp on this eNB, which when the UE is camping on it may be referred to as a source eNB, a current eNB or a serving eNB. The UE will further attach to the network A via the MME1. In step 502a the MME1 sends an Attach Accept response comprising a list of the TAIs supported by the MME1 and a list of equivalent PLMNs which indicates which networks are equivalent.

Action 503: When the UE is attached to a network but does not exchange any data with the network the UE or the eNB may release the connection between the UE and the eNB/MME. In step 503a the source eNB sends a RRCConnectionRelease message to the UE, which message may comprise IdleModeMobilityControlInfo dedicated for the UE.

Action 504: The UE enters RRC_IDLE mode and ECM_IDLE mode.

Action 505: When the UE is in IDLE_MODE it receives a broadcasted SIB comprising IdleModeMobilityControlInfo which is common for all UEs. The UE may use this broadcasted IdleModeMobilityControlInfo if it hasn't received any IdleModeMobilityControlInfo in step 503.

Action 506: The UE stores the information obtained from the steps 500, 502a, 503a and 505 for enabling cell reselection decisions in idle mode.

Action 507: The UE further receives broadcasted SIBs from eNBs such as the target eNB, which SIBs comprises networks supported by the eNBs, indicated by PLMN-IDs and the tracking area which the eNB is comprised in, which is indicated by the TAC. In this case, target eNB supports network A and D and is comprised in tracking area p. Although there is no support for network D shown in a core network node in FIG. 5, the network may comprise further core network nodes, such as eNBs, supporting this and other networks.

Action 508: Since the target eNB supports network A, the UE may decide to perform a cell reselection to a cell in the target eNB based on the information stored in step 6 and radio measurements performed.

Action 509: The UE further checks if the TAI of the new cell in the target eNB is included in the TAI list received in step 502*a*.

Action 510: If the TAI of the new cell is not included in the TAI list received in step 502*a*, the UE performs a Tracking Area Update procedure via the selected cell in the target eNB and the PLMN-ID. In this case, since the TAI of the new cell is A-p, the UE performs a Tracking Area Update to the network via the MME2, which supports the TAI=A-p.

The wireless communication industry is at the verge of a unique business crossroads. The growing gap between capacity and demand is an urgent call for new approaches and alternative network technologies to enable mobile operators to achieve more with less. Today, mobile broadband data is growing at an annual rate of 40-50 percent per year in the U.S. and other regions globally. Mobile service providers address these rapidly expanding traffic volumes through deployment of additional network functions, which will be a significant capital expenditure (CAPEX) challenge. The nature of the mobile broadband data traffic is also evolving with new services including new video applications, connected cars and the Internet of Things (IoT). This rapid capacity growth and increasing traffic diversity in LTE networks stresses the assumptions of existing network architectures and operational paradigms.

As expected by leading operators and vendors in Next Generation Mobile Networks (NGMN) association, diverse applications or services are expected to be provided by 5G networks. 5G will support countless emerging use cases with a high variety of applications and variability of their performance attributes: from delay-sensitive video applications to ultra-low latency, from high speed entertainment applications in a vehicle to mobility on demand for connected objects, and from best effort applications to reliable and ultra-reliable ones such as health and safety. Furthermore, use cases will be delivered across a wide range of devices, e.g., smartphones, wearables, MTCs, and across a fully heterogeneous environment.

Network Functions Virtualization (NFV) provides a new path that can increase the flexibility required by mobile service providers and network operators to adapt and accommodate this dynamic market environment. NFV is a new operational approach applying well-known virtualization technologies to create a physical Commercial Off-the-Shelf (COTS) distributed platform for the delivery of end-to-end services in the context of the demanding environment of telecom network infrastructure and applications.

Because EPC is critical to the realization and management of all LTE traffic, it is important to consider use cases related to virtualization of the EPC elements. Each individual EPC element also has specific considerations that determine whether to deploy with NFV. Virtualized EPC (vEPC) is a good example: Multiple virtualized network functions (VNF) can be deployed and managed on a Network Functions Virtualization Infrastructure (NFVI) but must cater to performance scalability in both signaling/control plane and user plane, each potentially demanding different levels of NFVI resources.

vEPC elements can benefit from more agile deployment and scalability. However, virtual resource monitoring and orchestration, along with service awareness, are essential for implementing elasticity effectively. Due to the nature of telecom networks, service Level Agreements (SLA) will be a key issue for a virtualized mobile core network. Because virtualization usually leads to a performance trade-off, equipment vendors must optimize data-plane processing to satisfy carrier-grade bandwidth and latency requirements and sufficient control-plane performance for SLAs needed to ensure availability of regulatory services, such as emergency calls.

VNF is a virtualized network function which serves as a VNF Software for providing virtual network capabilities. A VNF could be decomposed and instantiated in roles such as Virtualized MME (vMME), Virtualized PCRF (vPCRF), Virtualized SGW (vSGW) or Virtualized PDN-GW (vPDN-GW).

NFV is seen as an enabler for network slicing and network sharing that is described herein.

Network slicing is about creating logically separated partitions of the network, which may also be referred to as slices or network slices, addressing different business purposes. These network slices are logically separated to a degree that they can be regarded and managed as networks of their own.

Network slicing is a new concept that applies to both LTE Evolution and New 5G RAT, which herein is referred to as NX. The key driver for introducing network slicing is business expansion, i.e. improving the operator's ability to serve other industries, by offering connectivity services with different network characteristics, such as e.g. performance, security, robustness, and/or complexity.

The current main working assumption is that there will be one shared RAN infrastructure that will connect to several EPC instances, where one EPC instance relates to a network slice. As the EPC functions are being virtualized, it is assumed that an operator will instantiate a new CN when a new slice should be supported.

Network sharing, which is described in 3GPP TR 22.951 and 3GPP TS 23.251, is a way for operators to share the heavy deployment costs for mobile networks, especially in the roll-out phase. In the current mobile telephony marketplace, functionality that enables various forms of network sharing is becoming more and more important.

A network sharing architecture allows different core network operators to connect to a shared RAN. The operators do not only share the radio network elements, but may also share the radio resources themselves. In addition to this shared radio access network the operators may or may not have additional dedicated radio access networks.

The RAN sharing is based on the possibility for operators to share the same RAN and optionally the same spectrum by means of two standardized architectures, which are shown in FIG. 6. The first architecture is called Mobile Operator Core Network (MOCN) and consists of different participating operators which connect their CN infrastructure to a commonly shared RAN. In this case each participating operator can run CN-RAN procedures from its own managed RAN. In the MOCN configuration, the RAN routes the UE's initial access to the shared network to one of the available CN nodes. Supporting UEs shall inform the RAN of the chosen core network operator so that the RAN can route correctly.

A second architecture option is called Gateway Core Network (GWCN) and it consists of the shared RAN connecting to a single shared CN. Participating operators would therefore share the CN as well as the RAN.

The RAN may be managed by one of the participating operators or may be managed by a third party. It may also be possible that the CN infrastructure is managed by one of the participating operators or by a third party or it may be managed in part, i.e. for some nodes, by a third party and in part by the participating operator. Each participating operator has access to a set of resources both in the CN and in the RAN.

When looking at the wide range of applications and use cases that are addressed with a 5G network, it is quite obvious these cannot effectively be addressed with a traditional approach of having a purpose built network for each application. This will lead to high cost for networks and devices as well as inefficient use of valuable frequency resources. Obviously, different use cases put different requirements to future networks. Examples of such requirements may include acceptable interruption time, reliability and availability, acceptable latency, data rate, as well as cost per user. It would be quite difficult or cost-wise impossible to deploy a common network service to fulfill such extremely diverse requirements. In the situation, network slicing was proposed as a concept to fulfill rich requirements from various 5G use cases. Meanwhile, the network slicing concept is getting widely recognition in NGMN. A network slice supports the communication service of a particular connection type with a specific way of handling C-plane and U-plane for the service. A 5G slice could be composed by a collection of 5G network functions and possibly specific RAT with specific settings that are combined together for the specific use case or business model. It should be noted that not all slices contain the same network functions. A specific network service can be instantiated according to on demand requirements for third party users/operators and the business policy between the network service providers and network the service consumers. Thus, an operator may have one physical network infrastructure and one pool of frequency bands, which may support many separate virtualized networks, also called network slices. Each network slice may have unique characteristics for meeting the specific requirements of the use case/s it serves.

A key function of 5G Core network is to allow for flexibility in network service creation, making use of different network functions suitable for the offered service in a specific network slice, e.g. Evolved Mobile Broadband (MBB), Massive Machine Type Communication (MTC), Critical MTC, Enterprise, etc.

In addition to Service optimized networks there are more drivers for Network slicing, such as;

Business expansion by low initial investment: Given the physical infrastructure it is much easier to instantiate another Packet Core instance for the business expansion than to set up a new parallel infrastructure or even integrated nodes Low risk by no/limited impact on legacy: As the new instance is logically separated from the other network slices, the network slices can also provide resource isolation between each other. Thus introduction of a new isolated network slice will not impact the existing operator services and therefore only provide low risk Short Time To Market (TTM): The operators are concerned about the time it takes to set up the network for a new service. Slicing of the network for different services/operator use cases provides a separation of concern that can result in a faster setup of a network slice for a certain service as it is separately managed and with limited impact on other network slices Optimized use of resources: Today the network is supporting many different services but with new use cases and more diverging requirements there is a need for optimize the network for the specific type use case. Network slicing allows to match services to optimized network instances, and it also allows for a more optimized use of those specific resources Allows for individual network statistics: With service specific network slices and possibly even on the level of individual enterprises, there is a possibility of collecting network statistics specific for a limited and well defined group of users of the network slice. This is not the key driver for slicing but rather a benefit that may be a useful tool Slicing can also be used to isolate different services in an operator's network. Future networks are expected to support new use cases going beyond the basic support for voice services and mobile broadband currently supported by existing cellular network, e.g. 2G/3G/4G. Some example use cases include:

Evolution of MBB
    Evolved communication services
    Cloud services
    Extended mobility and coverage
Mission critical Machine Type Communication
    Intelligent traffic systems
    Smart grid
    Industrial applications
Massive Machine Type Communication
    Sensors/actuators
    Capillary networks
Media
    Efficient on-demand media delivery
    Media awareness
    Efficient support for broadcast services These use cases are expected to have different performance requirements, e.g. bit-rates, latencies, as well as other network requirements, e.g. mobility, availability, security etc., affecting the network architecture and protocols.

Supporting these use cases could also mean that new players and business relations are needed compared to existing cellular networks. For instance it is expected that future network should address the needs of Enterprise services
Government services, e.g. national and/or public safety
Verticals industries, e.g. automation, transportation
Residential users These different users and services are also expected to put new requirements on the network. FIG. 7 shows an example of a network slicing for a case when there exists different network slices in the core network for MBB, Massive MTC and Critical MTC. In other words, the network slices may comprise separate core network instances supporting the different network slices. In addition, it is also possible that parts of the EPC are shared between the different network slices. One such example of shared EPC functionality may be a core network node, such as a MME.

A RAN in a sliced network may be implemented with the following pre-requisites:

A RAN operator manages a number of eNBs which are comprised in the operators own transport network in the RAN.
    The RAN operator, CN operators and other participating parties in the shared system have mutual Service Level Agreements (SLA).
    The shared network supports a number of coexisting network slices, wherein each slice is served by part of the overall RAN/CN infrastructure. Each core network node, such as an MME, in the CN can handle one or several slices. Furthermore each cell of a RAN node, such as an eNB, can also handle one or several slices.

The aim of the network slicing is to provide a simple tool for cellular operators to introduce new services and features to different industries.

Due to the highly increased number of virtualized networks sharing the infrastructure of the communications network the capacity of the infrastructure might soon reach its limit. Furthermore, the increased number of parties, such as network operators and/or infrastructure owners, cooperating in the communications network, leads to an increased effort for coordinating different identifiers between the virtualized networks within the communications network in order to avoid wrongful routing of transmissions between the different network entities, such as network nodes and/or network slices. Such coordination is both time consuming and cost intensive for all parties involved.

Further, due to the highly increased number of network slices supported by each network, two cells and or RAN nodes supporting different networks, may support the same slices in equivalent networks. However, if the slice-IDs are not coordinated between the networks a wireless device performing a mobility procedure, such as a cell reselection to a slice which the wireless device supports and is currently connected to. If the cell and/or the RAN node, to which the wireless device performs the reselection, does not support the slice for which the wireless device performs the reselection, a connection request from the wireless device may be denied by the RAN node although the RAN node supports a slice equivalent to the slice supported by the wireless device. The wireless device will retry to connect to the same cell or to another cell supporting the slice supported of the wireless device until the connection request is accepted. This may lead to unnecessary signaling in the network and may also mean that the wireless device is out-of-service for both traffic terminating at the wireless device and traffic originating from the wireless device. Another problem is that the wireless device may be camping on a cell without knowing that it will not get any service for a specific slice from that cell. This may happen if the wireless device doesn't trigger a normal tracking area update when entering the cell to camp on.

SUMMARY

An object of embodiments herein is to provide a mechanism for reducing the risk of erroneous and rejected connection requests for a wireless device and thereby improve the performance and reliability of the communications network in an efficient manner.

According to an aspect of embodiments the object is achieved by a method performed by a wireless device, for handling a mobility procedure in a communication network. The communication network comprises a first network and a second network. The first network is associated with a core network node and with a first Radio Access Network (RAN) node. The second network is associated with a second RAN node. The first RAN node and the second RAN node each support a set of cells. The first and the second network further comprise partitioned sets of functionalities, wherein a first set of functionalities belongs to a first network slice supporting the wireless device. The first set of functionalities is separated from another set of functionalities out of a total set of functionalities in the first network and in the second network. The wireless device is associated with the first network and the first network slice. The network slices and corresponding network slice identities are un-coordinated between the first and the second network. The wireless device receives, from the core network node, a message comprising an indication of one or more combinations of networks and network slices equivalent to the first network slice associated with the wireless device in the first network. The wireless device further determines a cell from the second set of cells supported by the second RAN node, which cell supports an equivalent of the first slice associated with the wireless device, based on the indication received from the core network node.

According to still another aspect the object is achieved by providing a wireless device for handling a mobility procedure in a communication network. The communication network comprises a first network and a second network. The first network is associated with a core network node and with a first Radio Access Network (RAN) node. The second network is associated with a second RAN node. The first RAN node and the second RAN node each support a set of cells. The first and the second network further comprise partitioned sets of functionalities, wherein a first set of functionalities belongs to a first network slice supporting the wireless device. The first set of functionalities is separated from another set of functionalities out of a total set of functionalities in the first network and in the second network. The wireless device is associated with the first network and the first network slice. The network slices and corresponding network slice identities are un-coordinated between the first and the second network. The wireless device is configured to receive, from the core network node, a message comprising an indication of one or more combinations of networks and network slices equivalent to the first network slice associated with the wireless device in the first network. The wireless device is further configured to determine a cell from the second set of cells supported by the second RAN node, which cell supports an equivalent of the first slice associated with the wireless device, based on the indication received from the core network node.

According to yet a further aspect the object is achieved by providing a core network node for enabling a mobility procedure for a wireless device in a communication network. The communication network comprises a first network and a second network. The first network is associated with a core network node and with a first Radio Access Network (RAN) node. The second network is associated with a second RAN node. The first and the second network further comprise partitioned sets of functionalities, wherein a first set of functionalities belongs to a first network slice supporting the wireless device. The first set of functionalities is separated from another set of functionalities out of a total set of functionalities in the first network and in the second network. The wireless device is associated with the first network and the first network slice in a first cell of a first RAN node and a core network node. The network slices and corresponding network slice identities are un-coordinated between the first and the second network. The core network node is configured to transmit, to the wireless device, a message comprising an indication of one or more combinations of networks and network slices equivalent to the first network slice associated with the wireless device in the first network.

It is furthermore provided herein a computer program comprising instructions, which, when executed on at least one processor, cause the at least one processor to carry out any of the methods above, as performed by the first network node or the second network node. It is additionally provided herein a computer-readable storage medium, having stored thereon a computer program comprising instructions which, when executed on at least one processor, cause the at least one processor to carry out the method according to any of the methods above, as performed by the first network node or the second network node.

Embodiments herein introduce an efficient manner of reducing the risk of erroneous and rejected connection requests for a wireless device which is performing mobility procedures in a communications network. By indicating to the wireless device which cells support the network slice supported by the wireless device, the wireless device can take this information into account when performing the mobility procedures, such as cell selection and/or reselection, in order to find a cell to camp on. Thereby, unnecessary signaling from the wireless device to cells and/or RAN nodes which do not support the network slice of the wireless device is minimized, which increases the performance of the communications network. Furthermore, the risk of the wireless device camping on an erroneous cell is reduced which improves the reliability of the communications network.

Embodiments herein introduce an efficient manner of coordinating different identifiers between PLMNs when multiple PLMNs with slices are hosted in different RANs. By introducing a combination of network identity, such as a PLMN-ID, and a slice ID to indicate a particular slice, and further introducing an equivalent PLMN-ID and slice-ID information in different signaling procedures, the slice IDs do not have to be unique across different networks, such as e.g. PLMNs, which allows a reuse of slice ID values. Further, since Slice IDs do not need to be coordinated across different PLMNs the amount of cross-PLMN configurations can be minimized, thereby reducing the costs and the work load of running such networks. The embodiments herein also introduce an efficient way of mapping registered PLMNs and slices in the registered PLMN, to equivalent slices in an equivalent network.

BRIEF DESCRIPTION OF THE DRAWINGS

Embodiments will now be described in more detail in relation to the enclosed drawings, in which.

DETAILED DESCRIPTION

Figure 8:
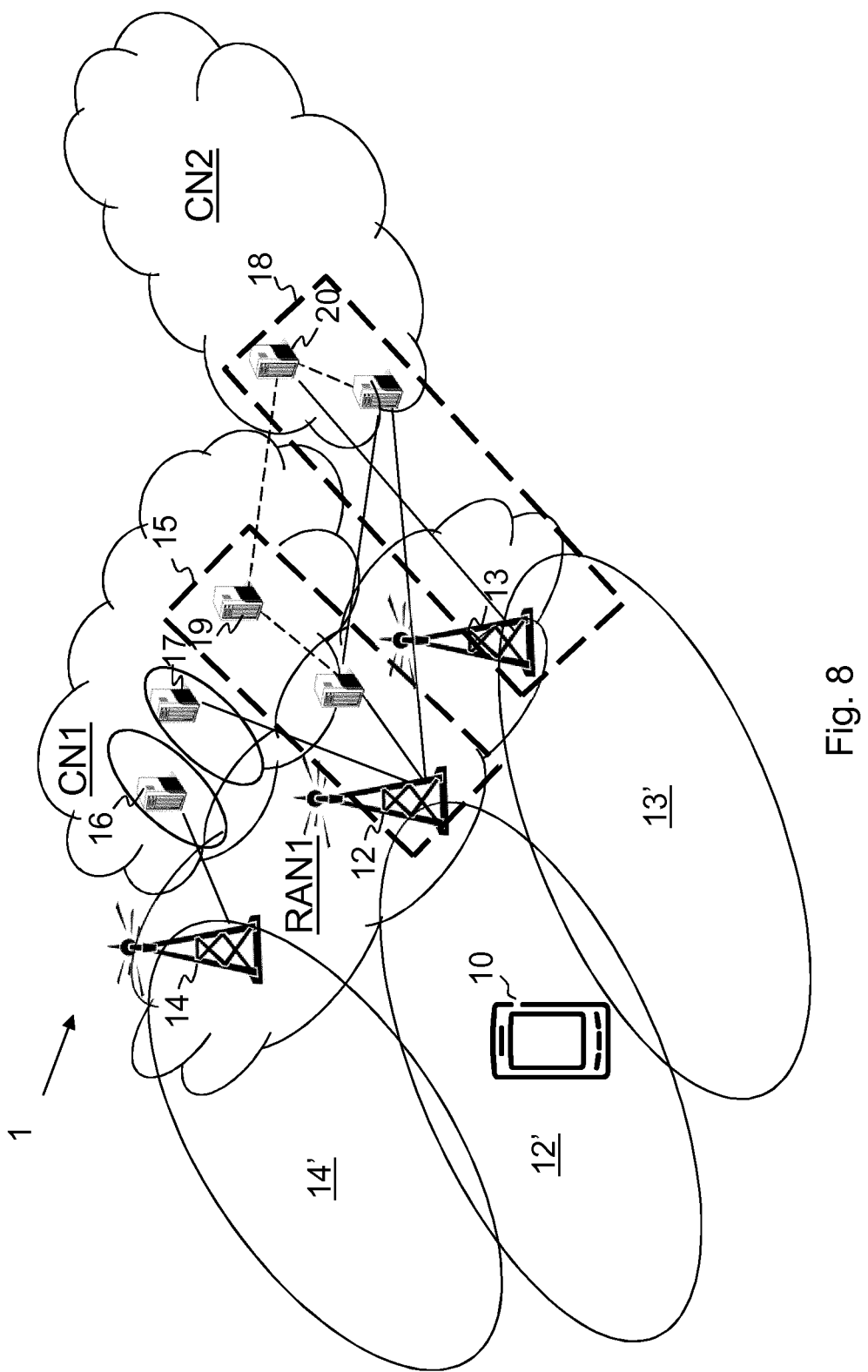
FIG. 8 is a schematic overview depicting a communication network according to embodiments herein.

Embodiments herein relate to communication networks in general. FIG. 8 is a schematic overview depicting a communication network 1. The communication network 1 comprises a RAN and a CN. The communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing communication systems such as e.g. 3G and LTE.

In the communication network 1, wireless devices e.g. a wireless device 10 such as a mobile station, a non-access point (non-AP) STA, a STA, a User Equipment (UE) and/or a wireless terminals, communicate via one or more Access Networks (AN), e.g. RAN, to one or more CNs. It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The communication network 1 comprises set of radio network nodes, such as radio network nodes 12, 13, 14 each providing radio coverage over one or more geographical areas, such as a cell 12', 13', 14' of a radio access technology (RAT), such as LTE, UMTS, Wi-Fi or similar. The radio network node 12, 13 may be a radio access network node such as radio network controller or an access point such as a wireless local area network (WLAN) access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of serving a wireless device within the cell, which may also be referred to as a service area, served by the radio network node 12, 13, 14 depending e.g. on the first radio access technology and terminology used. The radio network nodes 12, 13, 14 are comprised in a first radio access network (RAN1) of a first network.

Furthermore, the communication network 1 comprises a first core network (CN1) and a second core network (CN2). The radio network node 12 may communicate with both the CN1 and the CN2. The first network comprises the first core network CN1. The first network is a virtual network sliced into a number of network slices, the CN1 and/or the RAN1 may be a virtual network sliced into CN slices and/or RAN slices, each network slice or core network slice supports one or more type of wireless devices and/or one or more type of services i.e. each network slice supports a different set of functionalities. Network slicing introduces the possibility that the network slices are used for different services and use cases and these services and use cases may introduce differences in the functionality supported in the different network slices. Each network slice may comprise one or more network nodes or elements of network nodes providing the services/functionalities for the respective network slice. Each slice may comprise a network node such as a core network slice node or a RAN slice node. For example, a first network slice for e.g. MTC devices may comprise a first network slice node 16. A second network slice for e.g. MBB devices may comprise a second network slice node 17. Each network slice supports a set of functionalities out of a total set of functionalities in the communication network. E.g. the first network slice node 16 supports a first set of functionalities out of the total set of functionalities in the communication network 1. The first set of functionalities is separated from a different set of functionalities out of the total set of functionalities in the communication network 1. E.g. the first set of functionalities being associated with MTC devices is separated or logically separated, e.g. using separated data storage or processing resources, from a second set of functionalities of the second network slice being associated with MBB devices.

The first set of functionalities may use one or more resources in a core or RAN network of the communication network, which one or more resources are separated from other resources used by a different set of functionalities, i.e. different network slices, out of the total set of functionalities in the communication network 1. The resources may then be dedicated or virtually dedicated for each set of functionalities or network slice. Thus, the network slice node may be separated from other network slice nodes supporting a second set of functionalities out of the total set of functionalities in the communication network. Separated meaning herein physically separated wherein the network slice nodes may be executed on different hardware platforms and therefore using different resources of the hardware, and/or logically separated wherein the network slice nodes may be executed on a same hardware platform and use different resources such as memory parts or resources of processor capacity but may also use some same resources of the hardware e.g. a single physical network slice node may be partitioned into multiple virtual network slice nodes.

Hence, the first network slice node 16 supports the first set of functionalities out of the total set of functionalities in the first network of the communication network, which first set of functionalities belongs to the first network slice of the first network, and is separated from another set of functionalities out of the total set of functionalities in the first network.

A first network 15 comprises one or more first network nodes, such as first core network node 19 e.g. Radio Software Defined Networking (SDN) nodes, MMEs, S-GWs, Serving GPRS Support Nodes (SGSN), or corresponding nodes in e.g. a 5G network or similar. The GPRS meaning General Packet Radio Services. The first network node 15 may further be a radio access network node such as the first radio network node 12.

A second network 18 comprises one or more second network nodes, such as second core network node 20 e.g. Radio SDN nodes, MMEs, S-GWs, SGSNs, or corresponding nodes in e.g. a 5G network or similar. The second network node may further be a radio access network node such as the first radio network node 13.

In one embodiment described herein, the wireless device is in IDLE Mode and is camping on a first cell 12' of the first RAN node 12. The RAN node 12 which the wireless device is camping on may be referred to as a source RAN node. When the wireless device is in IDLE mode it will continuously look for a more suitable cell to camp on. This mobility procedure is referred to as a cell reselection procedure.

Problems have been identified in relation to idle mode mobility, such as cell selection and cell reselection procedures, for the wireless device 10 supporting network slicing, especially in cases when there exist geographically and/or frequency layer limited network slices i.e. network slices which are supported only in parts of the RAN.

In case of cell reselection in the same frequency layer or other frequency layers, the wireless device 10 that is connected to a specific network slice needs to know in which cells in the network the slice is supported. If not, the wireless device 10 may easily loose connection towards the current slice if the wireless device 10 selects a cell that has no support for the current slice for the wireless device 10. A similar problem occurs during cell selection if the wireless device 10 selects a cell 12', 13' not supporting the network slice for initial cell selection. In this case the connection request to the erroneous cell may be rejected.

Figure 1:
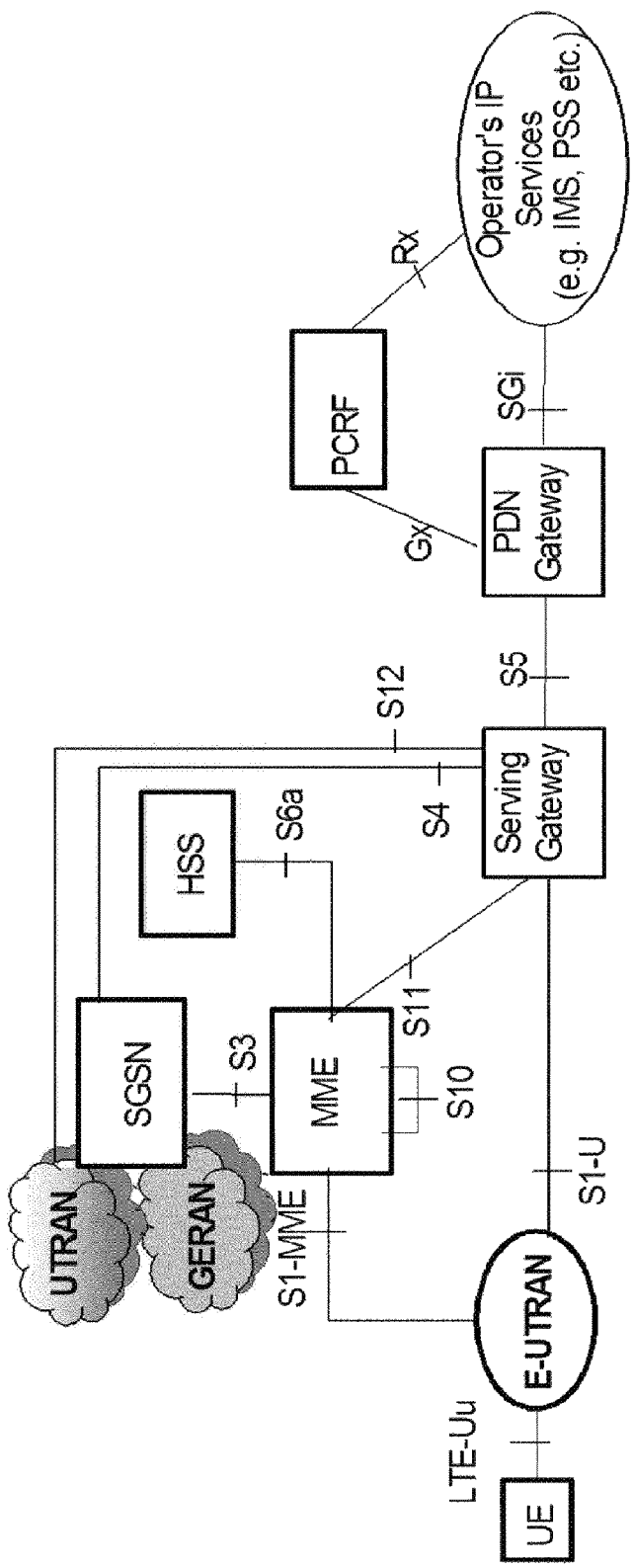
FIG. 1 is a schematic overview depicting a communication network according to prior art.
Figure 2:
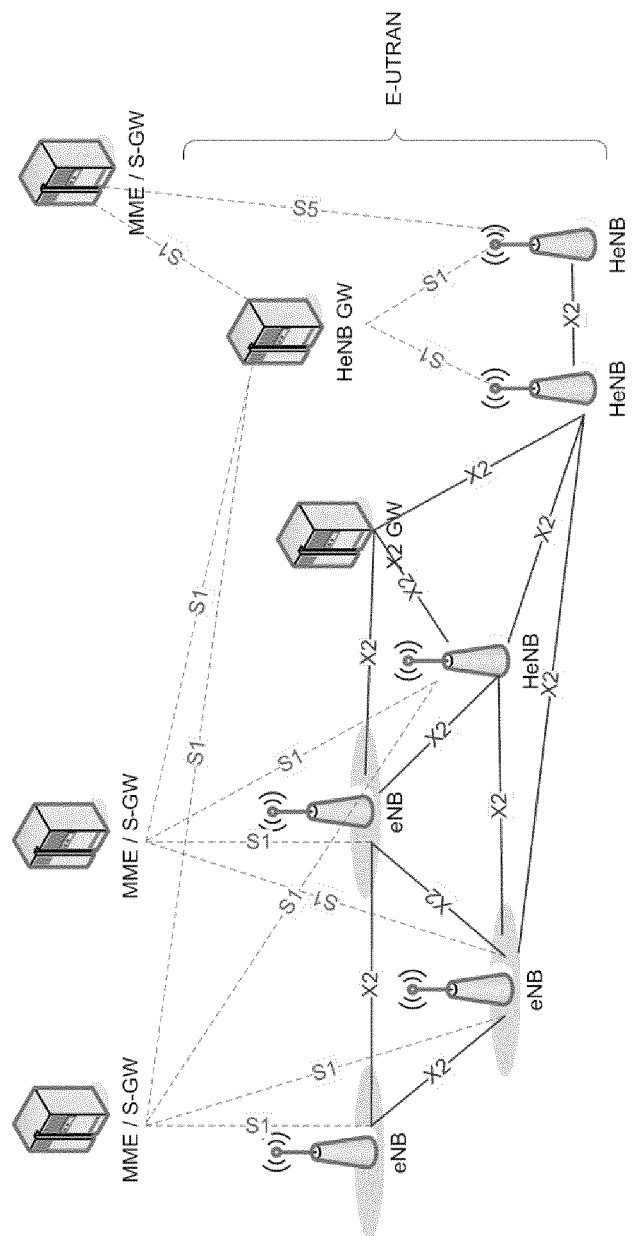
FIG. 2 is a schematic overview depicting a radio access network in connection with a core network.
Figure 3:
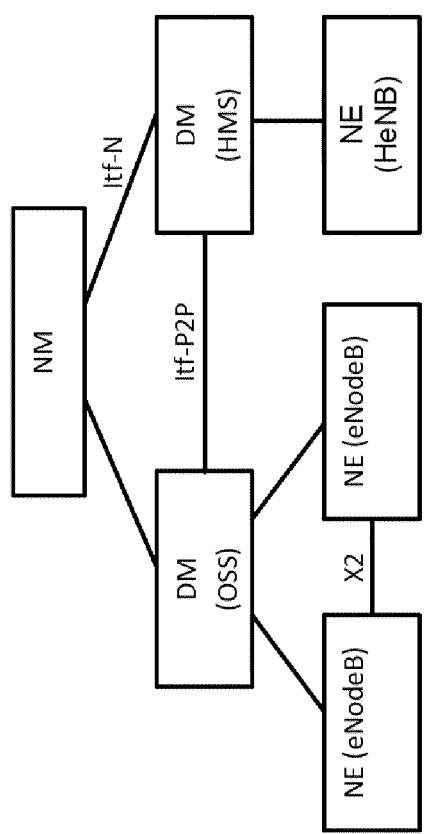
FIG. 3 is a schematic overview depicting a management system architecture for a communications network.
Figure 4:
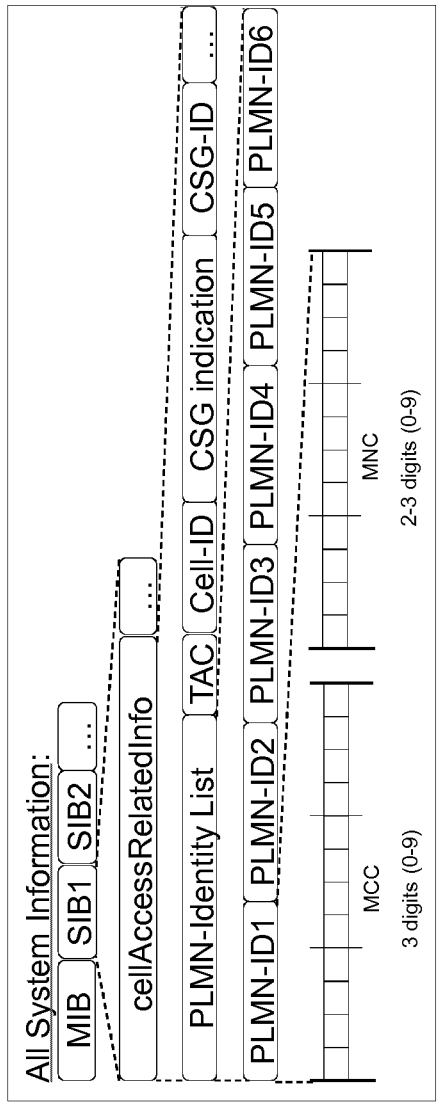
FIG. 4 is a schematic overview for a System Information transmitted in the network.
Figure 5:
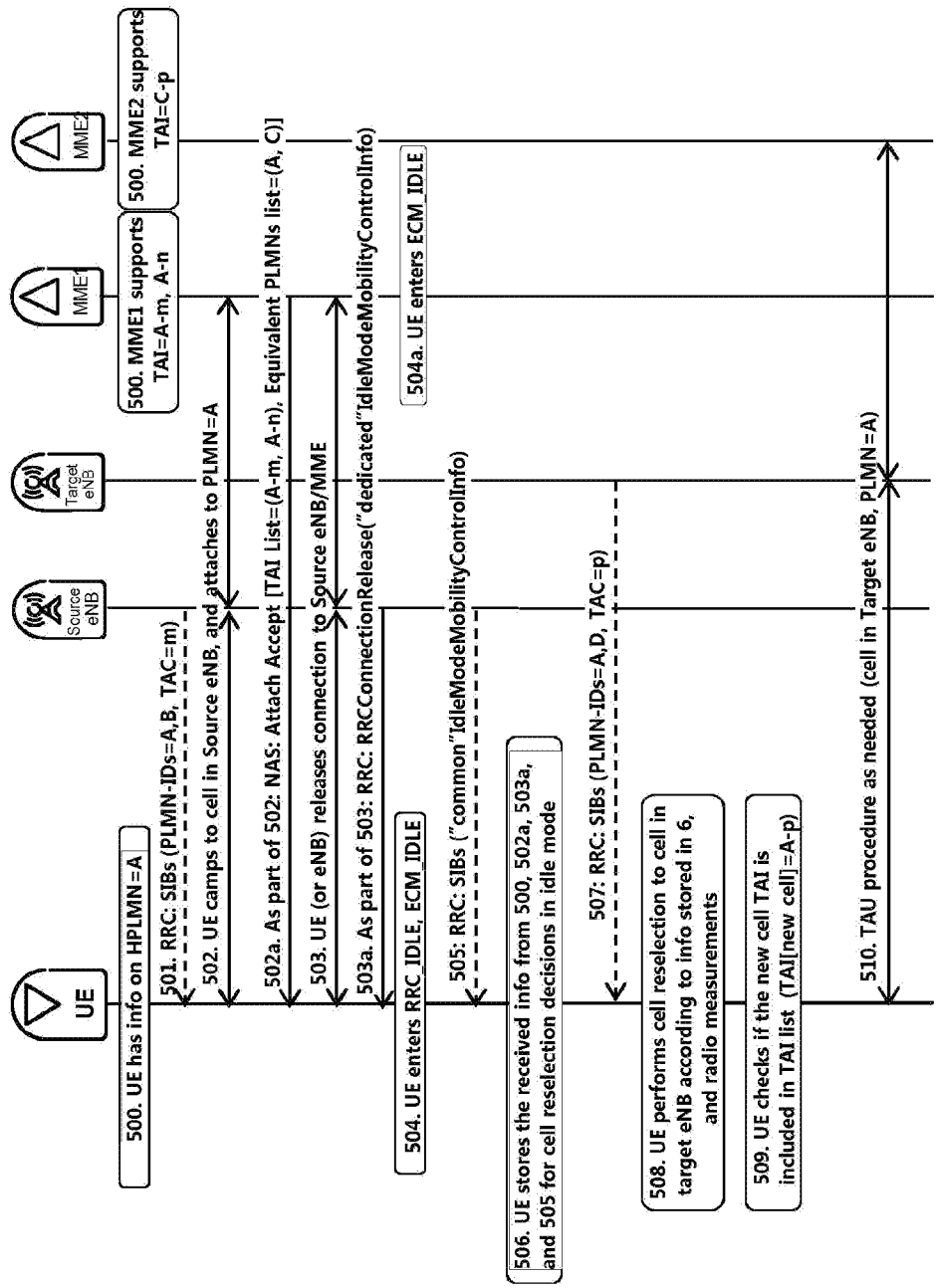
FIG. 5 is a signaling diagram depicting a mobility procedure according to prior art.
Figure 6:
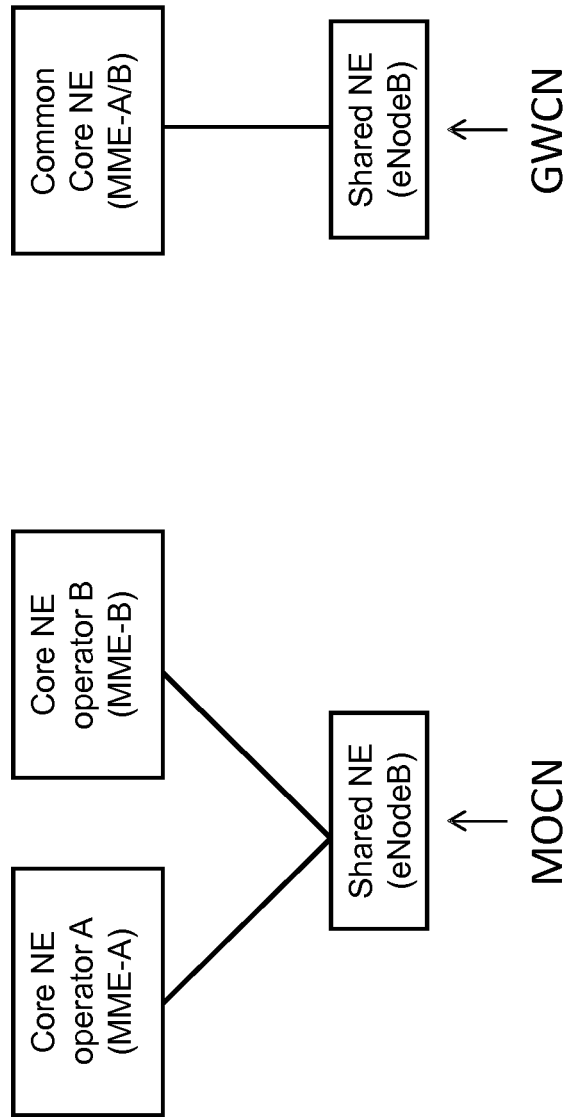
FIG. 6 is a schematic overview depicting examples of standardized architectures for sharing Radio Access Networks.
Figure 7:
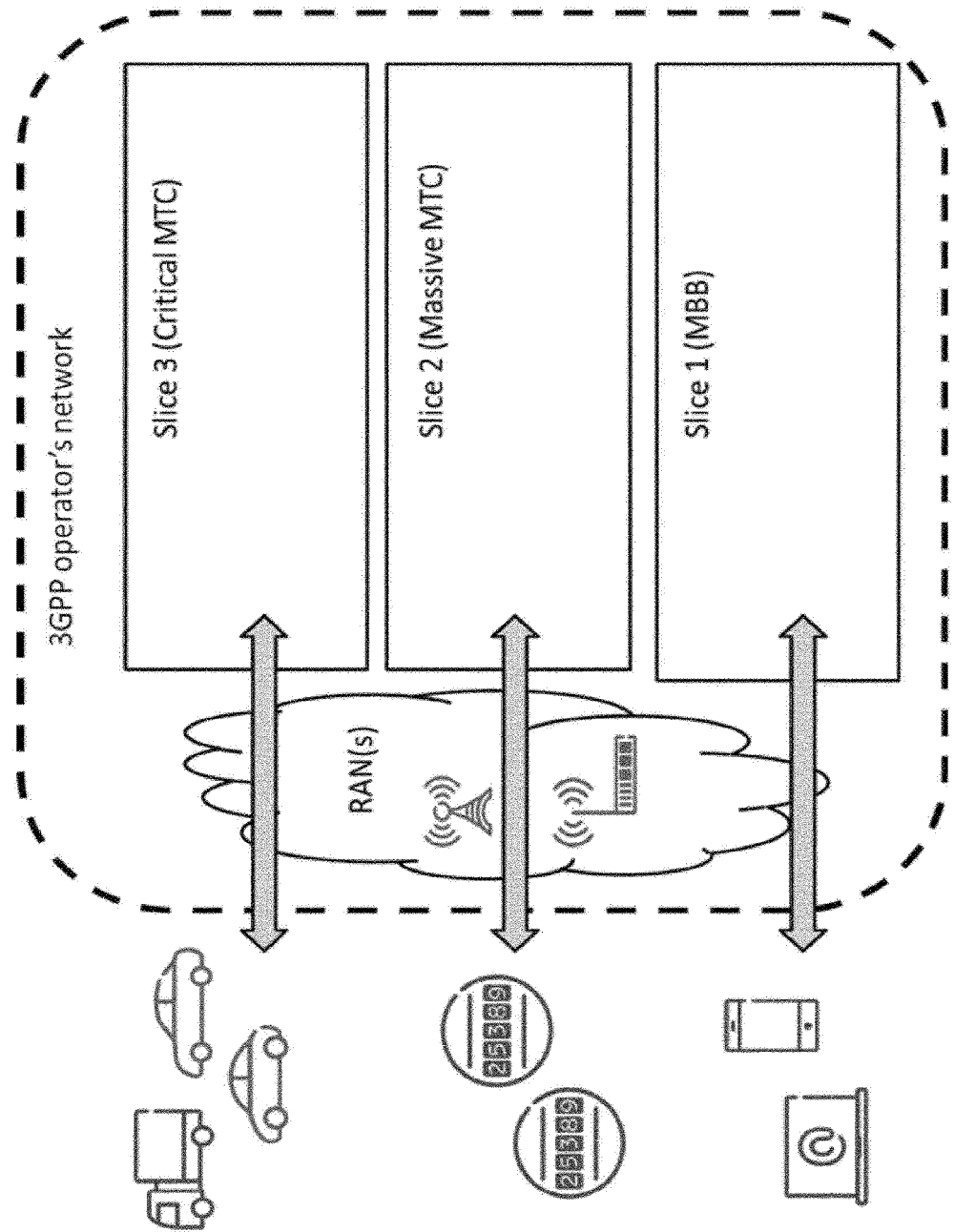
FIG. 7 is a schematic overview depicting an example of network slicing with slice specific core network instances according to prior art.
Figure 9:
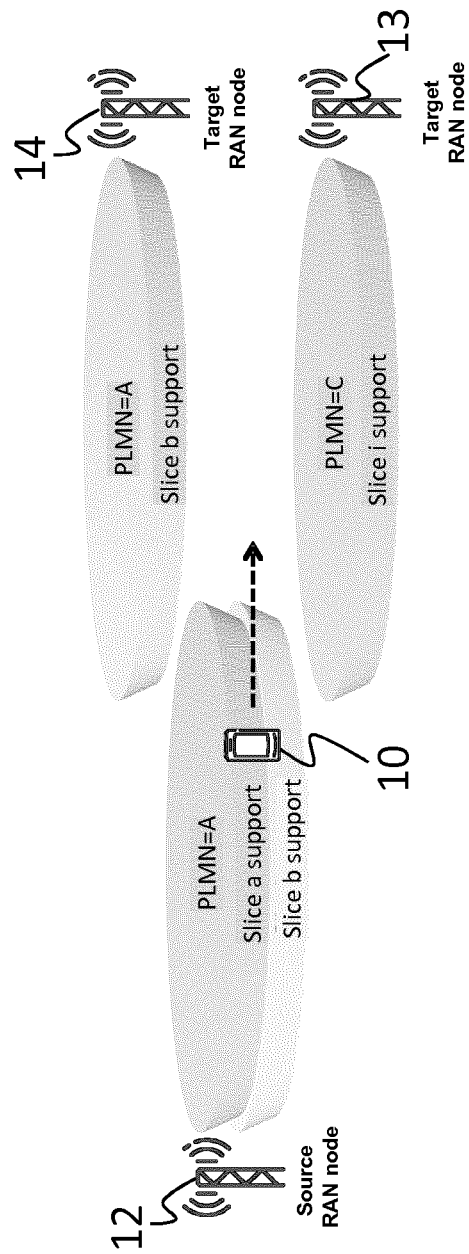
FIG. 9 is a schematic overview depicting a RAN configuration for slicing.

For example, for a radio network configuration according to FIG. 9, where the cells in the source RAN node 12 are supporting a network A, identified by the PLMN, and slices a and b, cells in a target RAN node, such as the RAN node 14, is supporting PLMN=A; slice=b, and cells in a second target RAN node 13 is supporting PLMN=C; slice=i, and slice a in PLMN=A is equivalent to slice i in PLMN=C. The wireless device 10 is initially connected to slice a through the source RAN node 12. When the wireless device 10 wants to perform a cell reselection it will look for a cell supporting the same network and the same network slice as it currently is associated with. The wireless device 10 may receive an indication from the RAN node 12, 13, 14 comprising information regarding the network and the network slices supported by a cell of the RAN node 10 and base the cell reselection decision based on this. However, in order for the wireless device 10 to be able to determine a cell with a slice ID equivalent to the network slice it is currently attached on, the slice IDs have to be coordinated between networks, otherwise the wireless device will not know if a cell in a target RAN node supporting a second network supports the slice ID associated with the wireless device. In case cells in the target RAN node 13 does support PLMN=A; slice a, but through PLMN=C, slice i, the wireless device 10 needs to get the information about this mapping in order to select the correct cell. Otherwise, the UE can easily loose connection towards the current slice if the UE selects a cell that has no support for the current slice for the UE. Furthermore, when the wireless device wants to request connection to slice a via any of the cells in the target RAN node 13, it will be rejected since neither cells in the target RAN nodes 13, 14 has a network connection towards a core network node that supports slice a. Furthermore, the wireless device would somehow need to translate the slice a for PLMN A, to slice i in PLMN C in step 510 described in FIG. 5 in case NAS TAU procedure has to be performed.

This behaviour is problematic for several reasons. It may result in the wireless device 10 attempting to access multiple cells and then being rejected. This may lead to unnecessary signaling in the network and may also mean that the wireless device 10 is out-of-service for both traffic terminating at the wireless device 10 and traffic originating from the wireless device 10. Another problem is that the wireless device 10 may be camping on a cell without knowing that it will not get any service for a specific slice. This may happen if the wireless device 10 doesn't trigger a normal tracking area update when entering the cell to camp on. A further problem may be that the wireless device will not try to access a cell, which may lead to the wireless device 10 camping on a cell with a bad connection or to the wireless device 10 loosing its connection towards the current slice when moving away from the source node 12.

Embodiments herein introduce an efficient manner of reducing the risk of erroneous and rejected connection requests for a wireless device which is performing mobility procedures in a communications network. By indicating to the wireless device which cells support the network slice supported by the wireless device, the wireless device can take this information into account when performing the mobility procedures, such as cell selection and/or reselection, in order to find a cell to camp on. Thereby, unnecessary signaling from the UE to cells and/or RAN nodes which do not support the network slice of the UE is minimized, which increases the performance of the communications network. Furthermore, the risk of the UE camping on an erroneous cell is reduced which improves the reliability of the communications network.

A first aspect of embodiments herein therefore relate to a method for explicitly broadcasting a slice identity for a cell to the wireless device 10.

In the embodiments herein, the current NAS signaling from the core network node 19 to the wireless device 10, is enhanced to also provide information about supported slices, which may e.g. be referred to as "slice support information". The "Equivalent PLMNs" list may be enhanced to also provide the "slice support information", for all equivalent PLMNs for the wireless device 10 supporting network slicing. The "slice support information" may be used as input for both PLMN selection and cell reselection. The core network node 19 indicates to the wireless device in which equivalent PLMNs the network slice which the wireless device is currently attached to is available. The indication may further comprise the corresponding slice identity in each equivalent PLMN. The "slice support information" may also be referred to as an "Equivalent slice list".

In current 3GPP standards the core network node, such as a MME, may return the "Equivalent PLMNs" list to the wireless device as part of two EMM procedures, the Attach procedure and the Tracking Area Update (TAU) procedure. The Attach Accept message is defined in Table 8.2.1.1 in 3GPP TS 24.301.

The Equivalent PLMNs list is further defined in 3GPP TS 24.008 in section 10.5.1.13. The current definition allows for 15 different PLMN-IDs to be included in the information element.

The "slice support information" may be included in the signaling from the core network node 19 to the wireless device 10 in several ways. In a first embodiment herein, the Equivalent PLMNs list maybe adapted to comprise an equivalent slice identifier for each equivalent PLMN.

In another embodiment, a new list may be created, which list comprises both the Equivalent PLMN-ID and every equivalent slice identifier.

In a further embodiment herein the equivalent slice information may be provided for multiple slices in one message. This is useful in a scenario where the wireless device is connected to multiple network slices via one core network node.

The following describes some detailed possibilities for the coding of the "slice support information" for equivalent network slices:

In a first embodiment, the list may contain {Slice identifier, PLMN-ID-List {PLMN-ID, list of equivalent slice identifiers with priority}}. In this case, multiple equivalent slice identifiers in different equivalent PLMNs may be indicated for a single current slice for the wireless device. Each equivalent PLMN-ID is listed only once and a corresponding list of equivalent slice identifiers for that PLMN-ID is provided. The priority parameter in the list may indicate which slice in the equivalent PLMN is most suitable for the wireless device 10.

In a second embodiment, the list may contain {Slice identifier, PLMN-List {PLMN-ID, slice identifier}}. In this case multiple equivalent slice identifiers in different equivalent PLMNs may be indicated for a single current slice for the wireless device 10. Each equivalent PLMN-ID is listed as many times as there exists equivalent slice identifiers.

In one example of the second embodiment above, the "slice support information" for equivalent network slices contains one or more combinations of {PLMN-ID, slice identifier}. An example of this is {A-a, C-i} indicating that a current slice for the wireless device is also available as the following slices in the different equivalent PLMNs:

PLMN=A, slice identifier=a
PLMN=C, slice identifier=i

The UE may then utilize the "slice support information" for equivalent network slices for both PLMN selection and cell reselection to ensure that connectivity to a specific network slice can be maintained.

The wireless device may use this information to map against the PLMN-ID and slice ID combinations provided in step 507 by the RAN nodes 12, 13, 14.

Furthermore, in step 510, the wireless device 10 may in the RRC connection request procedure provide the correct slice ID for the selected PLMN towards the target RAN node, which is used for core network node selection.

A broadcasted "slice support information" may be added explicitly in the system information sent from the RAN node 12, 13, 14, for example in the SIB1 in the cell for every supported PLMN. In one embodiment herein, the "slice support information" may be added to the PLMN-IdentityList part of SIB1. In one embodiment herein, up to 10 different "slice support information" can be indicated for each PLMN and the maximum number of a numerical slice identity may be 256. The system information may further comprise a user-friendly slice name which may contain up to 40 characters.

The size of SIB1 is however constrained due to coverage reasons. Hence the addition of the slice support information to SIB1 may be undesirable in large cells. In a further embodiment, the additional information may thus be added in another existing or new SIB, which SIB may not be transmitted equally often as the SIB1. However, this embodiment will have a slower wireless device access, due to longer latency for reading of necessary information to judge cell suitability.

Figure 10:
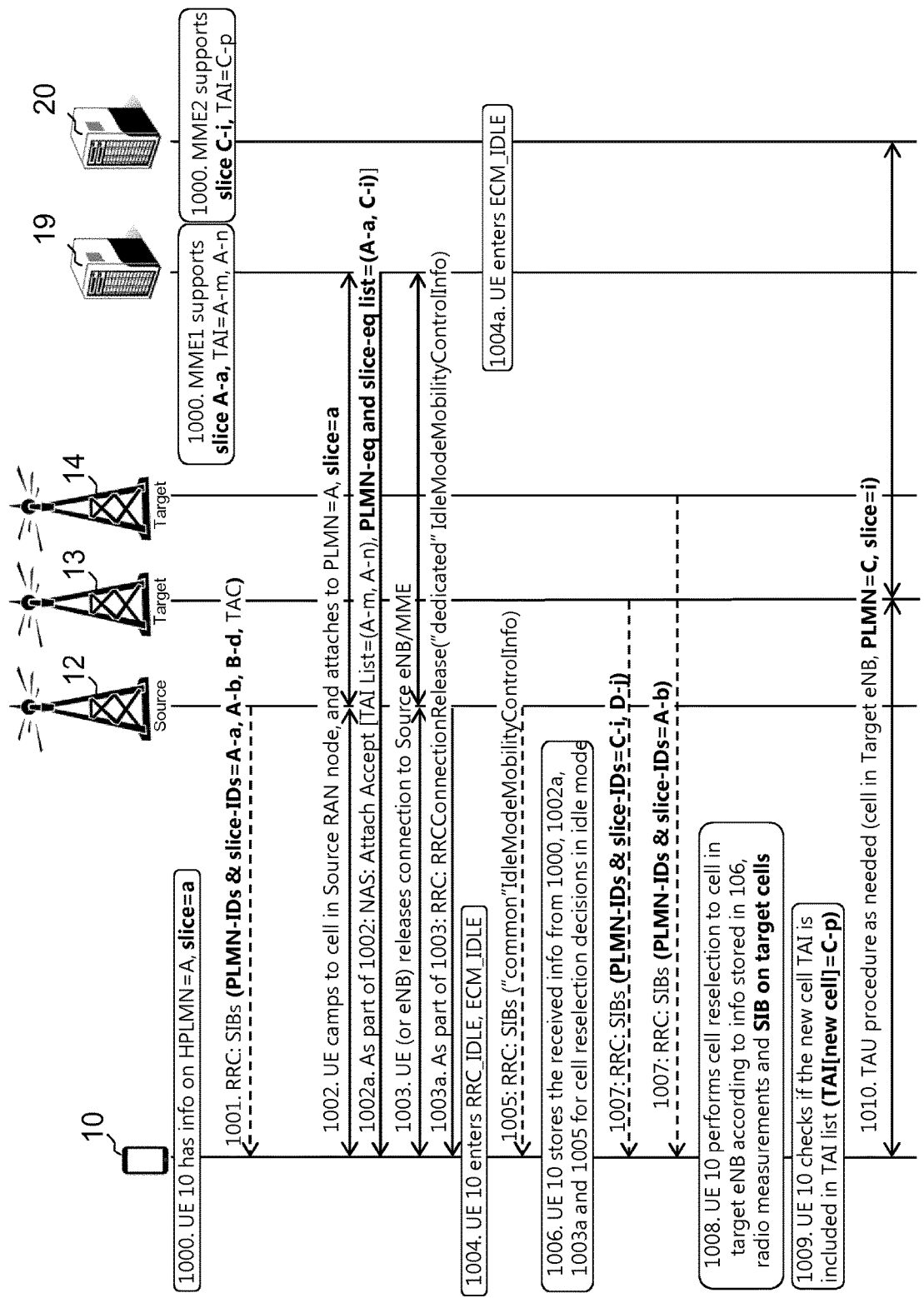
FIG. 10 is a signaling diagram depicting a mobility procedure according to a first aspect of embodiments herein.

The signal flow for embodiments described herein is shown in FIG. 10, where the identifiers introduced in the embodiments herein are indicated with bold font.

Action 1000: Before the wireless device 10 selects a cell of a RAN node 12, 13, 14 to camp on and a network to attach to the wireless device 10 may have information about its home network indicated by a HPLMN-ID and a network slice, indicated by a slice-ID, supported by the wireless device 10. This information may be stored in the wireless device 10 in e.g. a memory or a SIM/USIM. In the scenario described in FIG. 10 the wireless device 10 has network A as home network, i.e. HPLMN=A, and supports slice a, i.e. slice-ID=a. The first core network node 19 supports PLMN=A and network slice a, i.e. slice-ID=a, and the second core network node 20 supports PLMN=C and network slice i, i.e. slice-ID=i.

Action 1001: When the wireless device 10 is switched on or enters the communication network 1 it receives a broadcasted SIB from the RAN nodes 12, 13, 14 over the RRC protocol. The SIB according to this embodiment is updated to comprise information on the networks supported by each cell of the RAN node 12, 13, 14, indicated via the PLMN-ID, and the corresponding network slices supported by each cell for each supported network. The supported network and the corresponding supported slice may be indicated as <PLMN-ID><Slice-ID>. For the scenario described in FIG. 10 the wireless device 10 receives a SIB from the RAN node 12, comprising the indication <PLMN-ID=A><Slice-ID=a><PLMN-ID=A><Slice-ID=b><PLMN-ID=B><Slice-ID=d> which indicates that the cell of the RAN node 12 supports network A and the slices a and b in network A, and network B and slice d in network B.

Action 1002: Since a first cell of the RAN node 12 supports the network A and the slice a, which is the home network and a network slice associated to the home network of the wireless device 10, the wireless device 10 will select this cell in the RAN node 12 to camp on. In case there are several cells available which supports the home network and slice, the wireless device may perform further radio measurements on the cell to select the cell which offers the best quality of connection. When the wireless device 10 is camping on a cell of a RAN node, this RAN node may be referred to as the source RAN node. The wireless device 10 will further attach to slice (a) of the network A via the first core network node 19.

Action 1002a: As a response to the attachment of the wireless device 10 the core network node 19 sends an Attach Accept response comprising an indication of available equivalent PLMNs for the network which the wireless device is currently attached to. The indication may further comprise the corresponding slice identity for each equivalent PLMN, which slice-ID is equivalent to the slice-ID which the wireless device is currently attached to in the HPLMN.

This information may be added as an equivalent PLMN and equivalent slice-ID list, which herein may also be referred to as a "PLMN-eq and slice-eq list". The corresponding networks and slices for the network slice supporting the wireless device 10 may be indicated as following in the message <PLMN-ID><slice-ID>. For the scenario described in FIG. 10 the wireless device 10 receives a message from the core network node, comprising the indication <PLMN-ID=A><slice-ID=a><PLMN-ID=C><slice-ID=i> in the "PLMN-eq and slice-eq list". This indicates that a slice i, indicated by slice-ID=i, in network C, indicated by PLMN-ID=C is equivalent to slice-ID=a in network A.

The message may further comprise a TAI list comprising supported by the core network node 19 which are relevant for the wireless device 10.

Action 1003: When the wireless device 10 is attached to network A and slice a but does not exchange any data with the network, the wireless device 10 or the RAN node 12 may release the connection between the wireless device 10 and the RAN node/core network node.

Action 1003a: When the wireless device enters the source RAN node 12 sends a RRCConnectionRelease message to the wireless device 10, which message may comprise IdleModeMobilityControlInfo dedicated for the wireless device 10.

Action 1004: The wireless device 10 may enter RRC_IDLE mode and ECM_IDLE mode.

Action 1005: When the wireless device 10 is in IDLE_MODE it may receive a broadcasted SIB comprising IdleModeMobilityControlInfo which is common for all wireless device 10 from the source RAN node 12. The wireless device 10 may use this broadcasted IdleModeMobilityControlInfo if it hasn't received any IdleModeMobilityControlInfo in step 1003.

Action 1006: The wireless device 10 stores the information obtained from the steps 1000, 1002a, 1003a and 1005 for enabling cell reselection decisions in IDLE mode. When the wireless device is in IDLE mode it continuously evaluates if there is a more suitable cell to camp on and may perform a cell reselection if a more suitable cell is identified. The cell reselection may e.g. be performed due to the wireless device moving away from the source cell.

Action 1007: The wireless device 10 receives broadcasted SIBs from the RAN nodes 12, 13, 14. The cells of the RAN nodes 13, 14 are cells which the wireless device isn't currently camping on but which may be alternative cells to perform a cell reselection to. The RAN nodes 13, 14 may therefore be referred to as target RAN nodes. These broadcasted SIBs correspond to the SIBs received in Action 1001 and hence, also comprise the updated information on the networks supported by each cell of the RAN node 12, 13, 14, indicated via the PLMN-ID, and the corresponding network slices supported by each cell for each supported network. The supported network and the corresponding supported slice may be indicated as following <PLMN-ID><Slice-ID>. For the scenario described in FIG. 10 the wireless device 10 receives a SIB from the target RAN node 13, comprising the indication <PLMN-ID=C><Slice-ID=i> which indicates that a cell of the RAN node 13 supports network C and the slice i in network C. The wireless device 10 further receives a SIB from the target RAN node 14, comprising the indication <PLMN-ID=A><Slice-ID=b> which indicates that a cell of the RAN node 14 supports network A and the slice b in network A.

The SIB may further comprise a Tracking Area Code (TAC) indicating the tracking area of the cells of the RAN node.

Action 1008: The wireless device 10 may decide to perform a cell reselection to a cell in one of the target RAN nodes 13, 14 based on the information stored in step 1006, radio measurements performed and the information in the SIBs received from the target RAN nodes 13, 14. From the message received in action 1002a, the wireless device knows that the slice i in network C corresponds to slice a in network A. Since the target RAN node 14 only supports slice b in network A, the only cell which is relevant for a cell reselection is the cell in target RAN node 13 which supports slice i in network C which is equivalent to slice a. Since the target RAN node 13 is the only target RAN node supporting an equivalent network and an equivalent slice to network A and slice a, the wireless device 10 will perform a cell reselection procedure to a cell in the RAN node 13. When the wireless device performs the cell reselection it may indicate the equivalent network, indicated by the equivalent PLMN-ID, and the equivalent slice, indicated by the equivalent slice-ID. Since the target RAN node 13 supports the indicated PLMN-ID and the slice-ID it will accept the cell reselection from the wireless device 10 to a cell in the RAN node 13. Hence, it will not try to perform a cell reselection to the target RAN node 14 which is not supporting an equivalent to the slice which the wireless device is currently attached to, in this case slice a. Thereby, unnecessary signaling from the wireless device 10 to the RAN node 14 is avoided. This also reduces the risk of the wireless device 10 wrongfully connecting to a cell in the RAN node 14 which is not able to support the wireless device.

Action 1009: The wireless device 10 may further check if the TAI of the new cell in the target eNB is included in the TAI list received in step 1002a.

Action 1010: If the TAI of the new cell is not included in the TAI list received in step 1002a, the wireless device 10 performs a Tracking Area Update procedure based on the cell in the target RAN node 13, the PLMN-ID and the slice ID. In the scenario depicted in FIG. 9, since the TAI of the new cell is C-p, the wireless device will attach to the network via the second core network node 20, which supports the TAI=C-p.

The problem mentioned earlier, where the wireless device 10 doesn't know if the target cell supports the slice or not, is solved since the wireless device 10 retrieves the "PLMN-eq and slice-eq list" in step 1002a. The wireless device 10 matches the "PLMN-eq and slice-eq list" against the target cell's PLMN-ID and the slice-ID received in the SIB from the target RAN node in step 1007. Thereby, the wireless device 10 may determine if the slice is supported by the target cell or not, in order to ensure that connectivity to a specific network slice is maintained during cell reselection. Another advantage of this invention is that slice ID coordination between networks can be minimized. The only configuration needed is slice ID mapping between the network which the wireless device is currently registered to and equivalent networks to the registered network. This coordination can be treated as minimum as this mapping only has to be implemented in the registered network.

Figure 11:
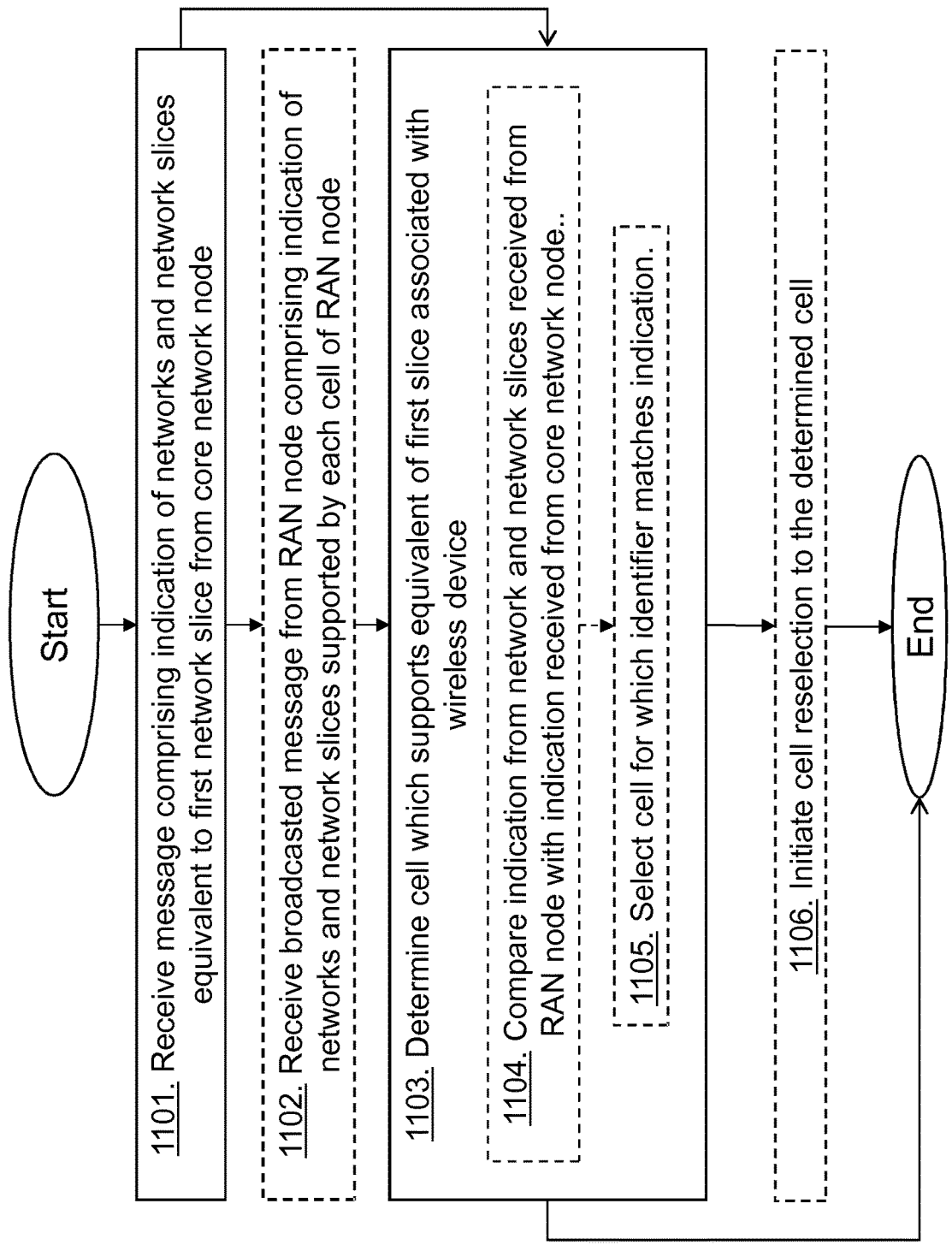
FIG. 11 is a schematic flowchart depicting a method performed by a wireless device according to embodiments herein.

The method actions performed by the wireless device 10, for handling a mobility procedure in a communication network 1 according to embodiments herein will now be described with reference to a flowchart depicted in FIG. 11. The actions do not have to be taken in the order stated below, but may be taken in any suitable order. Actions performed in some embodiments are marked with dashed boxes. The first network is associated with a core network node 19 and with a first set of Radio Access Network, RAN, nodes 12, 13. The second network is associated with a second RAN node 13, 14. The first RAN node 12 and the second RAN node 13 each support a set of cells. The first and the second network further comprise partitioned sets of functionalities, wherein a first set of functionalities belongs to a first network slice supporting the wireless device 10. The first set of functionalities is separated, or at least partly separated, from another set of functionalities out of a total set of functionalities in the first network and in the second network. The wireless device 10 is associated with the first network and the first network slice in a first cell of the first RAN node 12. The network slices and corresponding network slice identities are un-coordinated between the first and the second network.

Action 1101: The wireless device 10 receives, from the core network node 19, a message comprising an indication of one or more combinations of networks and network slices equivalent to the first network slice associated with the wireless device 10 in the first network.

According to one embodiment herein, the indication received from the core network node 19 may comprise a list of combinations of networks and network slices equivalent to the first network slice associated with the wireless device 10 in the first network.

According to an embodiment herein, the list may comprise an entry for each equivalent network identifier. For each network identifier the message comprises a corresponding list of equivalent network slice identifiers. This may be indicated in the message in the following form:

<PLMN-ID=A><Slice-ID=(a, b, d)><PLMN-ID=C><Slice-ID=(i, j, k)> . . . .

According to a second embodiment herein, the list may comprise an entry for each combination of equivalent network identifier and equivalent network slice identifier. This may be indicated in the message in the following form:

<PLMN-ID=A><Slice-ID=a><PLMN-ID=A><Slice-ID=b> . . . <PLMN-ID=C><Slice-ID=i><PLMN-ID=C><Slice-ID=j> . . . .

The list of equivalent network slice identifiers may further comprise an indication of the priority of each network slice identifier for each network identifier. Hence, for a specific network, identified by a specific PLMN-ID, a list of network slice identifiers, such as slice-IDs may be provided to the wireless device. The list of slice-IDs may further comprise a priority indication for the slice-IDs for a specific PLMN-ID, thereby the wireless device will be able to determine which of the equivalent networks and network slices it should try to connect to first.

The message may be received from the core network node 19 over a NAS protocol. The message may e.g. be an Attach Accept message, or any similar message sent from the core network node 19 as response to the wireless device attaching to a network and a network slice via the core network node 19.

This action 1101 is similar to the action 1002a described above in relation to FIG. 10.

Action 1102: The wireless device 10 may receive a message from the first RAN node 12 and/or the second RAN node 13 comprising an indication of one or more networks associated with the cells supported by the RAN node and the network slices supported by the cells for each associated network.

The message may be a broadcasted message comprising system information, which system information comprises information regarding the networks and network slices supported by the RAN node 12, 13, i.e. each RAN node will indicate the networks and network slices it supports. In one embodiment herein the message may be a System Information Block (SIB), which SIB comprises an indication of networks and network slices supported by the RAN node 12, 13. The networks may be indicated e.g. by a PLMN-ID and the network slices may be indicated e.g. by a slice ID. The network slices supported by the RAN node 12, 13 may be indicated for each supported network.

This action 1102 is similar to the action 1007 described above in relation to FIG. 10.

Action 1103: The wireless device 10 determines a cell from the second set of cells supported by the second RAN node 13, which cell supports an equivalent of the first slice associated with the wireless device 10, based on the indication received from the core network node 19. The wireless device may determine the cell from the second set of cells which supports an equivalent of the first slice associated with the wireless device 10 by performing the following actions.

This action 1103 is similar to the action 1008 described above in relation to FIG. 10.

Action 1104: The wireless device 10 may determine the cell from the second set of cells supported by the second RAN node by comparing the indication of the one or more networks and network slices received from the RAN node 12, 13 with the indication of equivalent networks and network slices received from the core network node 19.

This action 1104 is similar to the action 1008 described above in relation to FIG. 10.

Action 1105: The wireless device 10 may select a cell from the second set of cells supported by the second RAN node 13 for which an indicated network and network slices matches one of the combinations of network and network slice equivalent to the first network slice associated with the wireless device 10.

This action 1105 is similar to the action 1008 described above in relation to FIG. 10.

Action 1106: The wireless device 10 may initiate cell reselection to the determined cell from the second set of cells supported by the second RAN node 13.

This action 1106 is similar to the action 1008 described above in relation to FIG. 10.

Figure 12:
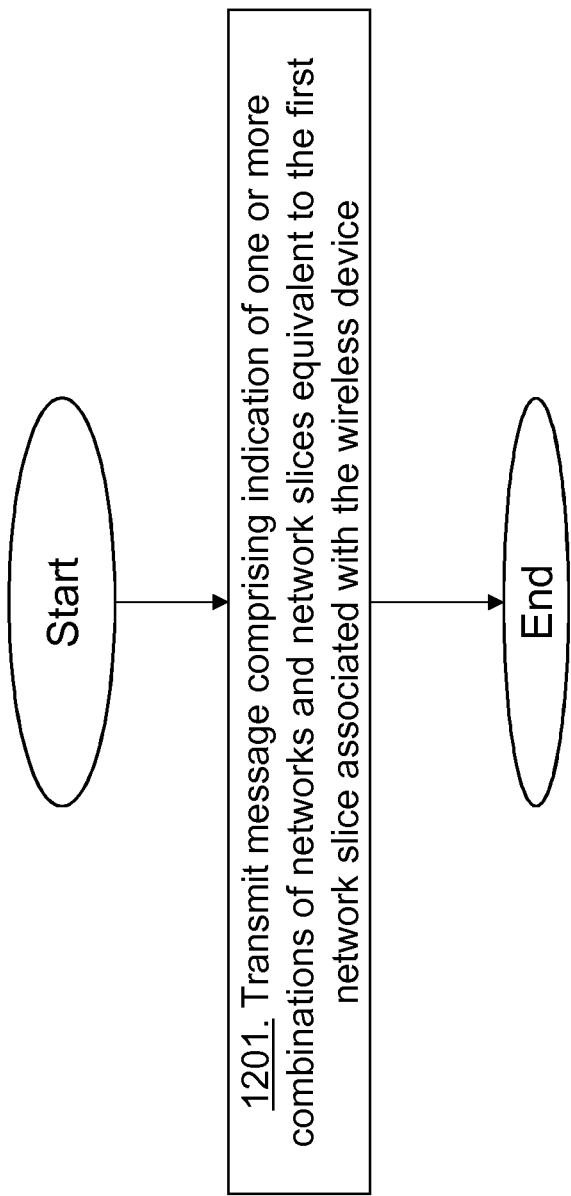
FIG. 12 is a schematic flowchart depicting a method performed by a RAN node according to embodiments herein.

The method actions performed by the core network node 19, for enabling a mobility procedure for a wireless device 10 in a communication network 1 according to embodiments herein will now be described with reference to a flowchart depicted in FIG. 12. The actions do not have to be taken in the order stated below, but may be taken in any suitable order. Actions performed in some embodiments are marked with dashed boxes. The communication network 1 comprises a first network and a second network. The first network is associated with a core network node 19 and with a RAN node 12. The second network is associated with a second RAN node 13. The first and the second network further comprise partitioned sets of functionalities, wherein a first set of functionalities belongs to a first network slice supporting the wireless device 10. The first set of functionalities is separated from another set of functionalities out of a total set of functionalities in the first network and in the second network. The wireless device 10 is associated with the first network and the first network slice in a first cell of the first RAN node 12. The network slices and corresponding network slice identities are un-coordinated between the first and the second network.

Action 1201: The core network node 19 transmits, to the wireless device 10, a message comprising an indication of one or more combinations of networks and network slices equivalent to the first network slice associated with the wireless device 10 in the first network.

In some embodiments herein, the indication transmitted from the core network node 19 may comprise a list of combinations of networks and network slices equivalent to the first network slice associated with the wireless device 10 in the first network.

According to an embodiment herein, the list may comprise an entry for each equivalent network identifier. For each network identifier the message comprises a corresponding list of equivalent network slice identifiers. This may be indicated in the message in the following form:
<PLMN-ID=A><Slice-ID=(a, b, d)><PLMN-ID=C><Slice-ID=(i, j, k)> . . . .

According to a further embodiment herein, the list may comprise an entry for each combination of equivalent network identifier and equivalent network slice identifier. This may be indicated in the message in the following form:
<PLMN-ID=A><Slice-ID=a><PLMN-ID=A><Slice-ID=b> . . . <PLMN-ID=C><Slice-ID=i><PLMN-ID=C><Slice-ID=j> . . . .

The list of equivalent network slice identifiers may further comprise an indication of the priority of each network slice identifier for each network identifier. Hence, for a specific network, identified by a specific PLMN-ID, a list of network slice identifiers, such as slice-IDs may be provided to the wireless device. The list of slice-IDs may further comprise a priority indication for the slice-IDs for a specific PLMN-ID, thereby the wireless device will be able to determine which of the equivalent networks and network slices it should try to connect to first.

The message may be received from the core network node 19 over a NAS protocol. The message may e.g. be an Attach Accept message, or any similar message sent from the core network node 19 as response to the wireless device attaching to a network and a network slice via the core network node 19.

This action 1201 is similar to the action 1002a described above in relation to FIG. 10.

Figure 13:
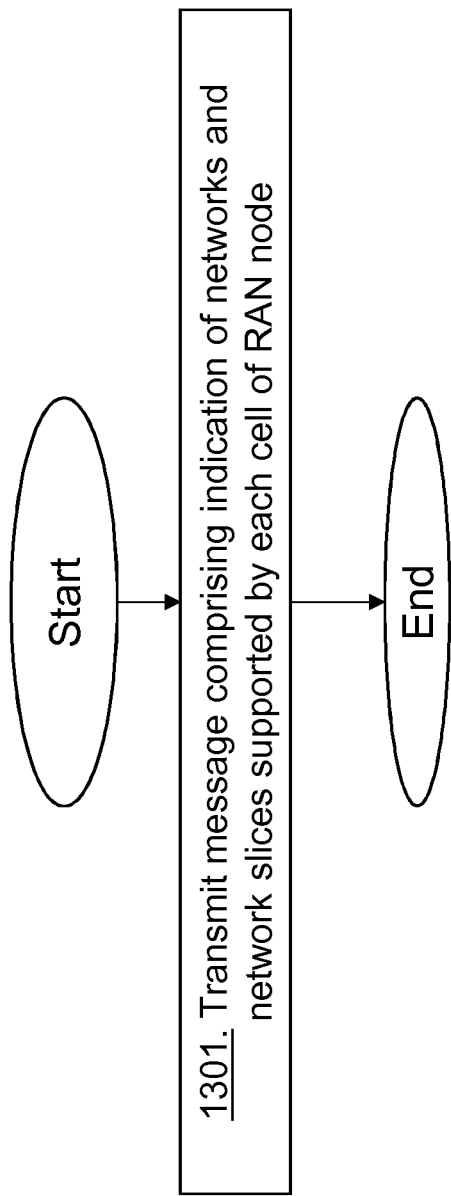
FIG. 13 is a schematic flowchart depicting a method performed by a core network node according to embodiments herein.

The method actions performed by a Radio Access Network (RAN) node 12, 13 for enabling a mobility procedure for a wireless device 10 in a communication network 1 according to embodiments herein will now be described with reference to a flowchart depicted in FIG. 13. The actions do not have to be taken in the order stated below, but may be taken in any suitable order. Actions performed in some embodiments are marked with dashed boxes. The communication network 1 comprises a first network and a second network. The first network is associated with a core network node 19 and with the RAN node 12. The second network is associated with the second RAN node 13. The first and the second network further comprise partitioned sets of functionalities, wherein a first set of functionalities belongs to a first network slice supporting the wireless device 10. The first set of functionalities is separated from another set of functionalities out of a total set of functionalities in the first network and in the second network. The wireless device 10 is associated with the first network and the first network slice in a first cell of the first RAN node 12. The network slices and corresponding network slice identities are un-coordinated between the first and the second network.

Action 1301: The RAN node 12, 13 transmits a message to the wireless device 10, which message comprises an indication of networks and network slices supported by each cell, for each cell of the RAN node 12, 13. The network supported by each cell may e.g. be indicated by a PLMN-ID, and the network slice supported may be indicated by a slice ID, in the form of <PLMN-ID><slice-ID>. In some embodiments herein, the message may be a System Information Block, SIB, such as e.g. SIB1 or any other SIB.

This action 1301 is similar to the action 1001 and 1007 described above in relation to FIG. 10.

Figure 14:
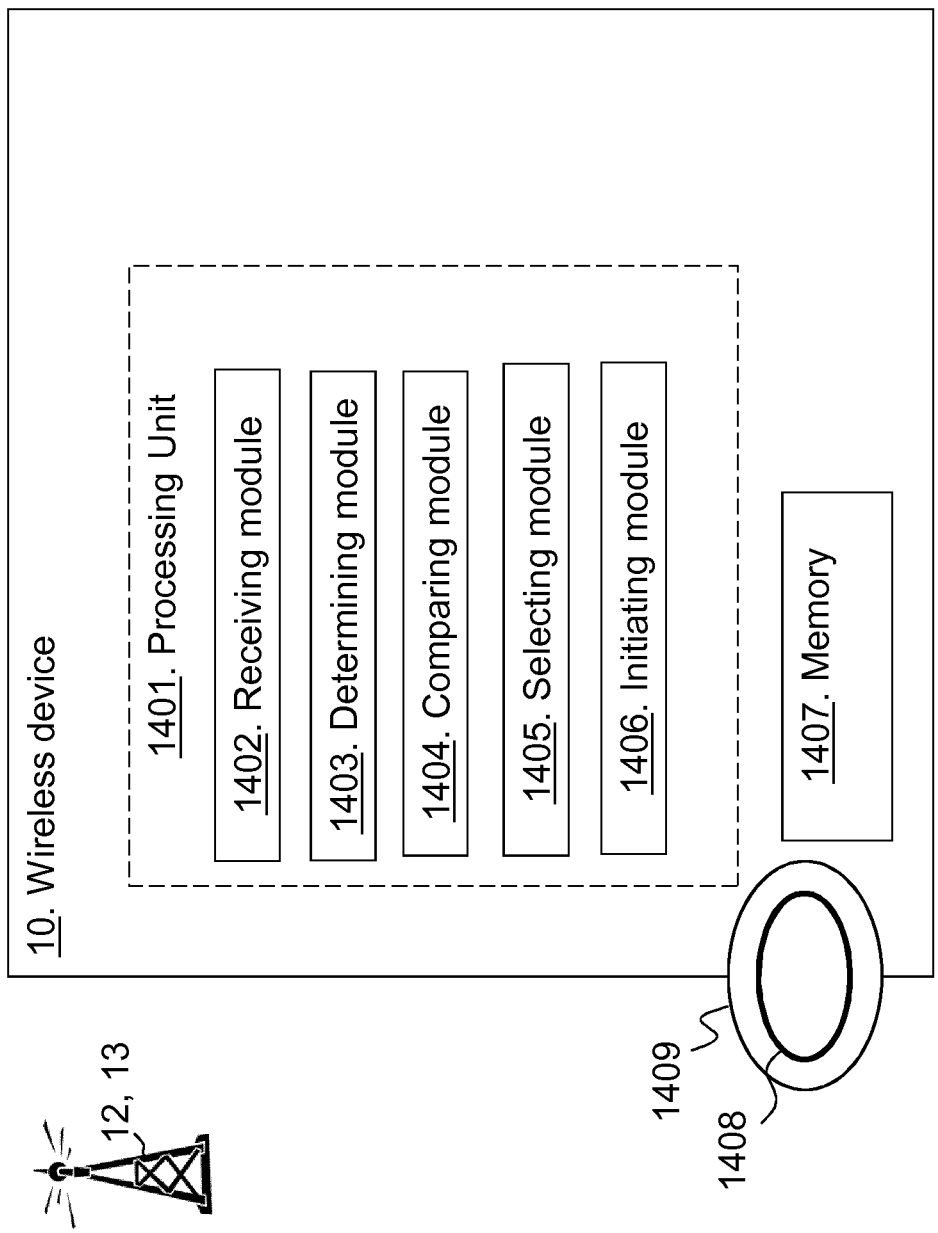
FIG. 14 is a block diagram depicting a wireless device according to embodiments herein.

FIG. 14 is a block diagram depicting the wireless device 10 for handling a mobility procedure in a communication network 1. The communication network 1 comprises a first network and a second network. The first network is associated with a core network node 19 and with a first RAN node 12. The second network is associated with a second RAN node 13. The first RAN node 12 and the second RAN node 13 each support a set of cells wherein the first and the second network further comprise partitioned sets of functionalities, wherein a first set of functionalities belongs to a first network slice supporting the wireless device 10. The first set of functionalities is separated from another set of functionalities out of a total set of functionalities in the first network and in the second network. The wireless device 10 is associated with the first network and the first network slice in a first cell of the first RAN node 12. The network slices and corresponding network slice identities are un-coordinated between the first and the second network. The wireless device 10 may comprise a processing unit 1401, e.g. one or more processors, configured to perform the methods described herein.

The wireless device 10 is configured to, e.g. by means of a receiving module 1402 and/or the processing unit 1401 being configured to, receive, from the core network node 19, a message comprising an indication of one or more combinations of networks and network slices equivalent to the first network slice associated with the wireless device 10 in the first network. The indication received from the core network node 19 may comprise a list of combinations of networks and network slices equivalent to the first network slice associated with the wireless device 10 in the first network.

The wireless device 10 may further be configured to, e.g. by means of the receiving module 1402 and/or the processing unit 1401 being configured to, receive the message from the core network node 19 over a NAS protocol.

The wireless device 10 may further be configured to, e.g. by means of the receiving module 1402 and/or the processing unit 1401 being configured to, receive a message from the RAN node 12, 13 comprising an indication of one or more networks associated with the cells supported by the RAN node 12, 13 and the network slices supported by the cells for each associated network.

The wireless device 10 is configured to, e.g. by means of a determining module 1403 and/or the processing unit 1401 being configured to, determine a cell from the second set of cells supported by the second RAN node 13, which cell supports an equivalent of the first slice associated with the wireless device 10, based on the indication received from the core network node 19.

The wireless device 10 may further be configured to, e.g. by means of a comparing module 1404, the determining module 1403 and/or the processing unit 1401 being configured to, compare the indication of the one or more networks and the network slices received from the RAN node 12, 13 with the indication of equivalent networks and network slices received from the core network node 19.

The wireless device 10 may further be configured to, e.g. by means of a selecting module 1405, the determining module 1403 and/or the processing unit 1401 being configured to, select a cell from the second set of cells supported by the second RAN node 13 for which an indicated network and network slices matches one of the combinations of network and network slice equivalent to the first network slice associated with the wireless device 10.

The wireless device 10 may further be configured to, e.g. by means of an initiating module 1406, the determining module 1403 and/or the processing unit 1401 being configured to, initiate a connection setup to the determined cell from the second set of cells supported by the second RAN node 13.

The wireless device 10 further comprises a memory 1407. The memory comprises one or more units to be used to store data on, such as system information, IDLE mode mobility information, network slice information, wireless device IDs, network slice and roaming policies, Slice IDs, applications to perform the methods disclosed herein when being executed, and similar.

The methods according to the embodiments described herein for the wireless device 10 are respectively implemented by means of e.g. a computer program 1408 or a computer program product, comprising instructions, i.e., software code portions, which, when executed on at least one processor, cause the at least one processor to carry out the actions described herein, as performed by the wireless device 10. The computer program 1408 may be stored on a computer-readable storage medium 1409, e.g. a disc or similar. The computer-readable storage medium 1409, having stored thereon the computer program, may comprise the instructions which, when executed on at least one processor, cause the at least one processor to carry out the actions described herein, as performed by the wireless device 10. In some embodiments, the computer-readable storage medium may be a non-transitory computer-readable storage medium.

Figure 15:
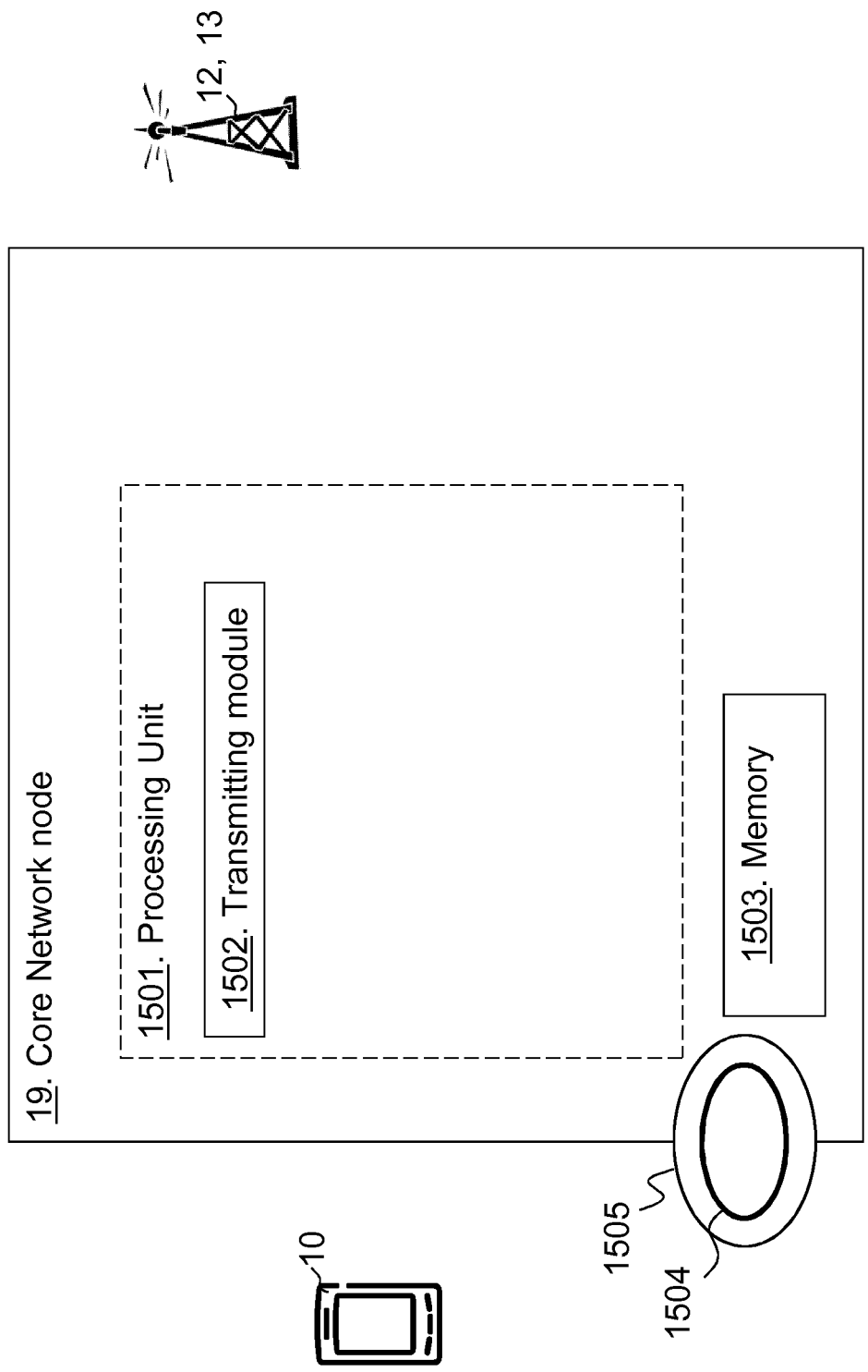
FIG. 15 is a block diagram depicting a RAN node according to embodiments herein.

FIG. 15 is a block diagram depicting the core network node 19 for enabling a mobility procedure for the wireless device 10 in the communication network 1. The communication network 1 comprises a first network and a second network. The first network is associated with a core network node 19 and with a first RAN node 12. The second network is associated with a second RAN node 13. The first and the second network further comprise partitioned sets of functionalities, wherein a first set of functionalities belongs to a first network slice supporting the wireless device 10. The first set of functionalities is separated from another set of functionalities out of a total set of functionalities in the first network and in the second network. The wireless device 10 is associated with the first network and the first network slice in a first cell of the first RAN node 12. The network slices and corresponding network slice identities are un-coordinated between the first and the second network. The core network node 19 may comprise a processing unit 1501, e.g. one or more processors, configured to perform the methods described herein.

The core network node 19 is configured to, e.g. by means of a transmitting module 1502 and/or the processing unit 1501 being configured to, transmit, to the wireless device 10, a message comprising an indication of one or more combinations of networks and network slices equivalent to the first network slice associated with the wireless device 10 in the first network.

The core network node 19 may be configured to, e.g. by means of a transmitting module 1502 and/or the processing unit 1501 being configured to, transmit the indication as a list of combinations of networks and network slices equivalent to the first network slice associated with the wireless device 10 in the first network.

The core network node 19 may be configured to, e.g. by means of a transmitting module 1502 and/or the processing unit 1501 being configured to, transmit the message to the wireless device 10 over a NAS protocol.

The core network node 19 further comprises a memory 1503. The memory comprises one or more units to be used to store data on, such as, system information, IDLE mode mobility information, network slice information, wireless device IDs, network slice and roaming policies, Slice IDs, applications to perform the methods disclosed herein when being executed, and similar.

The methods according to the embodiments described herein for the core network node 19 are respectively implemented by means of e.g. a computer program 1504 or a computer program product, comprising instructions, i.e., software code portions, which, when executed on at least one processor, cause the at least one processor to carry out the actions described herein, as performed by the core network node 19. The computer program 1504 may be stored on a computer-readable storage medium 1505, e.g. a disc or similar. The computer-readable storage medium 1505, having stored thereon the computer program, may comprise the instructions which, when executed on at least one processor, cause the at least one processor to carry out the actions described herein, as performed by the core network node 19. In some embodiments, the computer-readable storage medium may be a non-transitory computer-readable storage medium.

Figure 16:
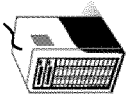
FIG. 16 is a block diagram depicting a core network node according to embodiments herein.

FIG. 16 is a block diagram depicting the RAN node 12, 13 for enabling a mobility procedure for a wireless device 10 in a communication network 1. The communication network 1 comprises a first network and a second network. The first network is associated with a core network node 19 and with the RAN node 12. The second network is associated with the second RAN node 13. The first and the second network further comprise partitioned sets of functionalities, wherein a first set of functionalities belongs to a first network slice supporting the wireless device 10. The first set of functionalities is separated from another set of functionalities out of a total set of functionalities in the first network and in the second network. The wireless device 10 is associated with the first network and the first network slice in a first cell of the first RAN node 12. The network slices and corresponding network slice identities are un-coordinated between the first and the second network. The RAN node 12, 13 may comprise a processing unit 1601, e.g. one or more processors, configured to perform the methods described herein.

The RAN node 12, 13 is configured to, e.g. by means of a transmitting module 1602 and/or the processing unit 1601 being configured to, transmit a message to the wireless device 10, which message comprises an indication of networks and network slices supported by each cell, for each cell of the RAN node 12, 13. The network supported by each cell may e.g. be indicated by a PLMN-ID, and the network slice supported may be indicated by a slice ID, in the form of <PLMN-ID><slice-ID>. In some embodiments herein, the message may be a System Information Block, SIB, such as e.g. SIB1 or any other SIB.

The RAN node 12 further comprises a memory 1603. The memory comprises one or more units to be used to store data on, such as system information, IDLE mode mobility information, network slice information, wireless device IDs, network slice and roaming policies, Slice IDs, applications to perform the methods disclosed herein when being executed, and similar.

The methods according to the embodiments described herein for the RAN node 12 are respectively implemented by means of e.g. a computer program 1604 or a computer program product, comprising instructions, i.e., software code portions, which, when executed on at least one processor, cause the at least one processor to carry out the actions described herein, as performed by the RAN node 12. The computer program 1604 may be stored on a computer-readable storage medium 1605, e.g. a disc or similar. The computer-readable storage medium 1605, having stored thereon the computer program, may comprise the instructions which, when executed on at least one processor, cause the at least one processor to carry out the actions described herein, as performed by the RAN node 12. In some embodiments, the computer-readable storage medium may be a non-transitory computer-readable storage medium.

Figure 17:
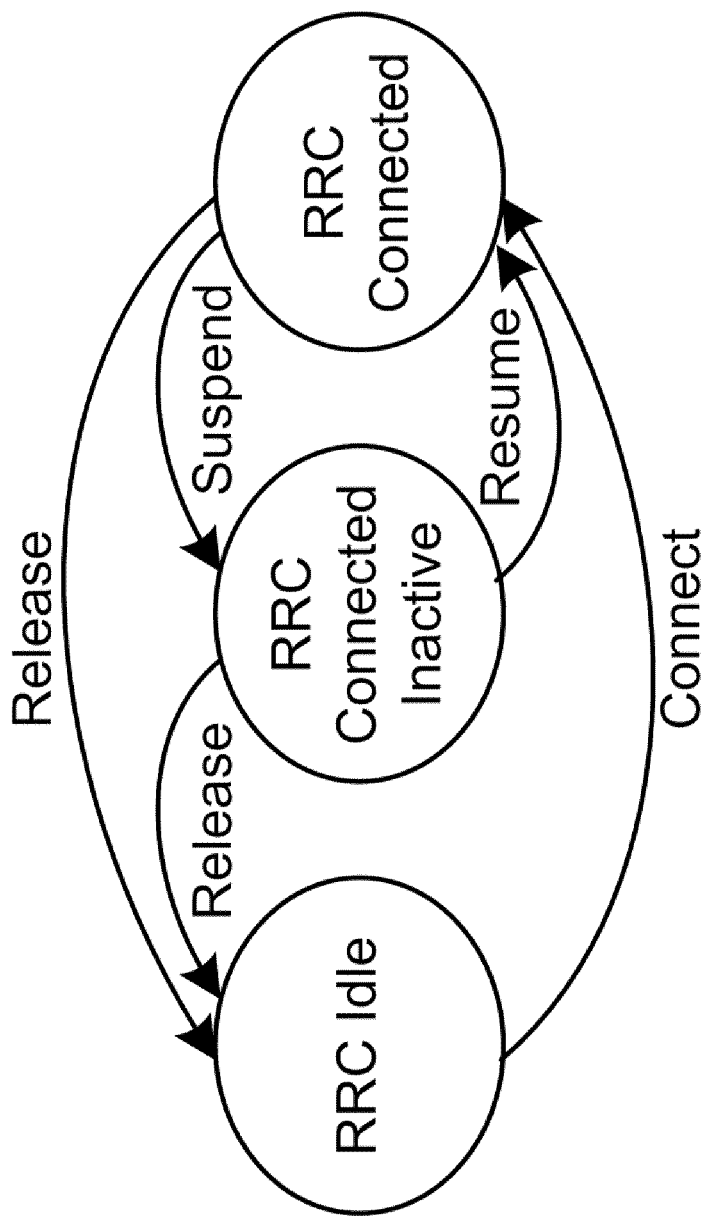
FIG. 17 schematic overview depicting states of a wireless device attached to a network.

A novel state model may be proposed for the 5G architecture enabling an efficient sleeping of a wireless device, a fast and lightweight transition from sleeping to active states and joint access optimizations. One likely model to be adopted is the following shown in FIG. 17.

The model consists of three states: "RRC Idle", "RRC Connected" and "RRC Connected Inactive". In the novel model the state transitions from RRC Idle to RRC Connected are expected to occur mainly during the first initial access, such as e.g. when the UE attaches to the network, or as a fallback case, such as e.g. when the devices and/or the network cannot use the previously stored RAN context. As a consequence, this transition is not expected to occur as often as in LTE.

On the other hand, transitions from "RRC Connected Inactive" to "RRC Connected" are expected to occur quite often and should be optimized as a lightweight and fast transition. The novel "RRC Connected Inactive" state designed to be used as the primary sleep state for the 5G access has as one of the characteristics the maintenance of context information by the wireless device and the network when the moves from "RRC Connected" to "RRC Connected Inactive". Some of these characteristics are currently being standardized by 3GPP for LTE as well and may be referred to as Suspended state.

Therefore, when it comes to the wireless device state model assumptions relevant for the embodiments described herein, the described cell selection and cell reselection enhancements may also occur for 5G devices in RRC Idle as currently in LTE. The described cell selection and cell reselection enhancements may also apply for wireless devices in the RRC Connected Inactive state, which may also be referred to as a Dormant state, and also for wireless devices in Suspended state. Although the embodiments herein are described for a wireless device in IDLE mode, the embodiments may be equally applicable in these similar states of the wireless device.

As will be readily understood by those familiar with communications design, the description applied to a 'cell' is equally applicable to all UE-based mobility, such as e.g. selection and re-selection, in NX even if the concept/term 'cell' is replaced by a corresponding concept/term such as e.g. a beam, a beam group or service area, which describes a geographical area covered by a RAN node.

Embodiments herein relate to a network with network slices i.e. a (core or RAN or both) network with partitioned sets of functionalities wherein the core network node 19, the wireless device 10 and/or the RAN node 12 may support the first set of functionalities out of the total set of functionalities in the network of the communication network. The first set of functionalities belongs to the first network slice of the network, and is separated from another set of functionalities out of the total set of functionalities in the network.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes will appreciate the cost, performance, and maintenance trade-offs inherent in these design choices.

Although the embodiments herein are described for an LTE-like architecture it shall be noted that they are equally applicable to any architecture based on an evolution of the S1 interface.

When using the word "comprise" or "comprising" it shall be interpreted as non-limiting, i.e. meaning "consist at least of". When using the word "set" herein, it shall be interpreted as meaning "one or more".

In the embodiments herein, being associated with shall be interpreted as somehow being related to, this may e.g. be the wireless device 10 camping on or being connected to a cell which has support for the network and the network slice and/or the wireless device having local information regarding the network and the network slice, such as e.g. having locally stored the network as a home network indicated with a HPLMN and the network slice being stored as a home network slice supporting the wireless device in the home network.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a wireless device, for handling a mobility procedure in a communication network, wherein the communication network comprises a first network and a second network, wherein the first network is associated with a core network node, wherein the first network is further associated with a first Radio Access Network (RAN) node, wherein the second network is associated with a second RAN node, wherein the first RAN node and the second RAN node each support a set of cells, wherein the first network and the second network further comprise partitioned sets of functionalities, wherein a first set of functionalities belongs to a first network slice supporting the wireless device, wherein the first set of functionalities is separated from another set of functionalities out of a total set of functionalities in the first network and in the second network, wherein the wireless device is associated with the first network and the first network slice in a first cell of the first RAN node, and wherein network slices and corresponding network slice identities are un-coordinated between the first network and the second network, the method comprising:

receiving, from the core network node, a message comprising an indication of one or more combinations of networks and network slices equivalent to the first network slice associated with the wireless device in the first network;

receiving, from at least one of the first RAN node and the second RAN node, a message comprising an indication of one or more networks associated with cells supported by the first RAN node and the second RAN node, and network slices supported by the cells for each associated network; and determining a cell from a second set of cells supported by the second RAN node, wherein the cell supports an equivalent of the first network slice associated with the wireless device, based on: the indication received from the core network node and the indication received from the at least one of the first RAN node and the second RAN node.

2. The method according to claim 1, wherein the determining comprises:

comparing the indication of the one or more networks and the network slices received from the at least one of the first RAN node and the second RAN node with the indication of equivalent networks and network slices received from the core network node; and selecting the cell from the second set of cells supported by the second RAN node for which an indicated network and network slices matches one of the combinations of network and network slice equivalent to the first network slice associated with the wireless device in the first network.

3. The method according to claim 1, wherein the method further comprises:

initiating a connection setup to the determined cell from the second set of cells supported by the second RAN node.

4. The method according to claim 1, wherein the indication received from the core network node comprises a list of combinations of networks and network slices equivalent to the first network slice associated with the wireless device in the first network.

5. The method according to claim 4, wherein the list comprises entries for equivalent network identifiers and for each equivalent network identifier a corresponding list of equivalent network slice identifiers.

6. The method according to claim 5, wherein the list of equivalent network slice identifiers further comprises an indication of priority of each equivalent network slice identifier for each equivalent network identifier.

7. The method according to claim 4, wherein the list comprises an entry for each combination of equivalent network identifier and equivalent network slice identifier.

8. The method according to claim 1, wherein the message received from the core network node is received by the wireless device over a Non Access Stratum (NAS) protocol.

9. A non-transitory computer-readable storage medium, having stored thereon a computer program comprising instructions which, when executed on at least one processor, cause the at least one processor to carry out the method according to claim 1, as performed by the wireless device.

10. A method performed by a core network node, for enabling a mobility procedure for a wireless device in a communication network, wherein the communication network comprises a first network and a second network, wherein the first network is associated with a core network node, wherein the first network is further associated with a first Radio Access Network (RAN) node, wherein the second network is associated with a second RAN node, wherein the first network and the second network further comprise partitioned sets of functionalities, wherein a first set of functionalities belongs to a first network slice supporting the wireless device, wherein the first set of functionalities is separated from another set of functionalities out of a total set of functionalities in the first network and in the second network, wherein the wireless device is associated with the first network and the first network slice in a first cell of the first RAN node, and wherein network slices and corresponding network slice identities are un-coordinated between the first network and the second network, the method comprising:
- transmitting, to the wireless device, a message comprising an indication of one or more combinations of networks and network slices equivalent to the first network slice associated with the wireless device in the first network, wherein the indication comprises a list of combinations of networks and network slices equivalent to the first network slice associated with the wireless device in the first network.

11. The method according to claim 10, wherein the list comprises entries for equivalent network identifiers and for each equivalent network identifier a corresponding list of equivalent network slice identifiers.

12. The method according to claim 11, wherein the list of equivalent network slice identifiers further comprises an indication of priority of each equivalent network slice identifier for each equivalent network identifier.

13. The method according to claim 10, wherein the list comprises an entry for each combination of equivalent network identifier and equivalent network slice identifier.

14. The method according to claim 10, wherein the message sent to the wireless device is sent over a Non Access Stratum (NAS) protocol.

15. A wireless device for handling a mobility procedure in a communication network, wherein the communication network comprises a first network and a second network, wherein the first network is associated with a core network node, wherein the first network is further associated with a first Radio Access Network (RAN) node, wherein the second network is associated with a second RAN node, wherein the first RAN node and the second RAN node each support a set of cells, wherein the first network and the second network further comprise partitioned sets of functionalities, wherein a first set of functionalities belongs to a first network slice supporting the wireless device, wherein the first set of functionalities is separated from another set of functionalities out of a total set of functionalities in the first network and in the second network, wherein the wireless device is associated with the first network and the first network slice in a first cell of the first RAN node, wherein network slices and corresponding network slice identities are un-coordinated between the first network and the second network, and wherein the wireless device is configured to:
- receive, from the core network node, a message comprising an indication of one or more combinations of networks and network slices equivalent to the first network slice associated with the wireless device in the first network;
- receive, from at least one of the first RAN node and the second RAN node, a message comprising an indication of one or more networks associated with cells supported by the first RAN node and the second RAN node, and network slices supported by the cells for each associated network; and
- determine a cell from a second set of cells supported by the second RAN node, wherein the cell supports an equivalent of the first network slice associated with the wireless device, based on: the indication received from the core network node and the indication received from the at least one of the first RAN node and the second RAN node.

16. The wireless device according to claim 15, wherein the wireless device is further configured to determine by being configured to:
- compare the indication of the one or more networks and the network slices received from the at least one of first RAN node and the second RAN node with the indication of equivalent networks and network slices received from the core network node; and
- select the cell from the second set of cells supported by the second RAN node for which an indicated network and network slices matches one of the combinations of network and network slice equivalent to the first network slice associated with the wireless device in the first network.

17. The wireless device according to claim 15, wherein the wireless device is further configured to:
- initiate a connection setup to the determined cell from the second set of cells supported by the second RAN node.

18. The wireless device according to claim 15, wherein the indication received from the core network node comprises a list of combinations of networks and network slices equivalent to the first network slice associated with the wireless device in the first network.

19. The wireless device according to claim 15, wherein the wireless device is configured to receive the message from the core network node over a Non Access Stratum (NAS) protocol.

20. A core network node for enabling a mobility procedure for a wireless device in a communication network, wherein the communication network comprises a first network and a second network, wherein the first network is associated with a core network node, wherein the first network is further associated with a first Radio Access Network (RAN) node, wherein the second network is associated with a second RAN node, wherein the first network and the second network further comprise partitioned sets of functionalities, wherein a first set of functionalities belongs to a first network slice supporting the wireless device, wherein the first set of functionalities is separated from another set of functionalities out of a total set of functionalities in the first network and in the second network, wherein the wireless device is associated with the first network and the first network slice in a first cell of the first RAN node, wherein network slices and corresponding network slice identities are un-coordinated between the first network and the second network, and wherein the core network node is configured to:
- transmit, to the wireless device, a message comprising an indication of one or more combinations of networks and network slices equivalent to the first network slice associated with the wireless device in the first network, wherein the indication comprises a list of combinations of networks and network slices equivalent to the first network slice associated with the wireless device in the first network.

21. The core network node according to claim 20, wherein the message sent to the wireless device is sent over a Non Access Stratum (NAS) protocol.

* * * * *